US010855404B2

(12) United States Patent
Yin et al.

(10) Patent No.: US 10,855,404 B2
(45) Date of Patent: *Dec. 1, 2020

(54) SYSTEMS AND METHODS FOR CARRIER AGGREGATION

(71) Applicant: Sharp Kabushiki Kaisha, Sakai (JP)

(72) Inventors: Zhanping Yin, Vancouver, WA (US); Shohei Yamada, Osaka (JP); John Michael Kowalski, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 107 days.

This patent is subject to a terminal disclaimer.

(21) Appl. No.: 16/273,695

(22) Filed: Feb. 12, 2019

(65) Prior Publication Data

US 2019/0173618 A1    Jun. 6, 2019

Related U.S. Application Data

(63) Continuation of application No. 13/946,983, filed on Jul. 19, 2013, now Pat. No. 10,237,020.

(51) Int. Cl.
*H04L 1/18* (2006.01)
*H04L 5/14* (2006.01)
*H04L 5/00* (2006.01)

(52) U.S. Cl.
CPC .......... *H04L 1/1812* (2013.01); *H04L 1/1854* (2013.01); *H04L 5/001* (2013.01);
(Continued)

(58) Field of Classification Search
None
See application file for complete search history.

(56) References Cited

U.S. PATENT DOCUMENTS 8,416,739 B2    4/2013 Li et al.
8,514,826 B2    8/2013 Han et al.
(Continued)

FOREIGN PATENT DOCUMENTS

WO    2012061410         5/2012
WO    2012124980 A2      9/2012
(Continued)

OTHER PUBLICATIONS

U.S. Appl. No. 61/732,851, "Advanced Wireless Communications Systems and Techniques", filed Dec. 3, 2012.
(Continued)

*Primary Examiner* — Gregory B Sefcheck
(74) *Attorney, Agent, or Firm* — Austin Rapp

(57) ABSTRACT

A User Equipment (UE) for performing carrier aggregation is described. The UE includes a processor and instructions stored in memory that is in electronic communication with the processor. The UE determines a duplex method of each serving cell for frequency-division duplexing (FDD) and time-division duplexing (TDD) carrier aggregation. At least one serving cell is a TDD cell and at least one serving cell is a FDD cell. The UE also determines physical downlink shared channel (PDSCH) Hybrid Automatic Repeat Request Acknowledgement/Negative Acknowledgement (HARQ-ACK) transmission timing for a serving cell. When a primary cell is a TDD cell, the PDSCH HARQ-ACK transmission timing for the serving cell is determined based on a downlink (DL) association set for the serving cell. The UE further sends PDSCH HARQ-ACK information based on the PDSCH HARQ-ACK transmission timing.

8 Claims, 17 Drawing Sheets

(52) U.S. Cl.
CPC .......... *H04L 5/0055* (2013.01); *H04L 1/1858* (2013.01); *H04L 5/1469* (2013.01)

(56) References Cited

U.S. PATENT DOCUMENTS

| | | | |
|---|---|---|---|
| 8,670,379 B2 | 3/2014 | Yamada et al. | |
| 8,724,492 B2 | 5/2014 | Frank et al. | |
| 8,811,332 B2 | 8/2014 | Yin et al. | |
| 8,817,755 B2 | 8/2014 | Wang et al. | |
| 8,861,394 B2 | 10/2014 | Han et al. | |
| 8,885,525 B2 | 11/2014 | Hsieh et al. | |
| 8,891,353 B2 | 11/2014 | Ebrahmim Tazeh Mahalleh et al. | |
| 8,891,402 B2 | 11/2014 | Yin et al. | |
| 8,917,586 B2 | 12/2014 | Harrison et al. | |
| 8,923,199 B2 | 12/2014 | Lindoff et al. | |
| 8,948,119 B2 | 2/2015 | Ahn et al. | |
| 8,953,635 B2 | 2/2015 | Yin et al. | |
| 9,007,963 B2 | 4/2015 | Wang et al. | |
| 9,019,871 B2 | 4/2015 | Yang et al. | |
| 9,030,973 B2 | 5/2015 | Park | |
| 9,112,693 B2 | 8/2015 | Yin et al. | |
| 9,124,401 B2 | 9/2015 | Yin et al. | |
| 9,125,188 B2* | 9/2015 | Tamaki | H04L 1/1854 |
| 9,160,475 B2 | 10/2015 | Lee | |
| 9,160,513 B2 | 10/2015 | Chen et al. | |
| 9,172,519 B2 | 10/2015 | Seo et al. | |
| 9,185,564 B2 | 11/2015 | Yin et al. | |
| 9,185,703 B2 | 11/2015 | Yang et al. | |
| 9,203,559 B2 | 12/2015 | Wang et al. | |
| 9,247,527 B2 | 1/2016 | He et al. | |
| 9,295,055 B2 | 3/2016 | Cheng et al. | |
| 9,338,765 B2 | 5/2016 | Oizumi et al. | |
| 9,386,608 B2 | 7/2016 | He et al. | |
| 9,480,052 B2 | 10/2016 | Yin et al. | |
| 9,510,295 B2 | 11/2016 | Park et al. | |
| 9,532,344 B2 | 12/2016 | Park et al. | |
| 9,538,503 B2* | 1/2017 | Papasakellariou | H04L 5/001 |
| 9,559,817 B2* | 1/2017 | Yin | H04L 5/0032 |
| 9,577,812 B2 | 2/2017 | Hwang et al. | |
| 9,706,568 B2 | 7/2017 | Ekpenyong | |
| 9,722,760 B2 | 8/2017 | Stern-Berkowitz et al. | |
| 9,730,207 B2* | 8/2017 | Lee | H04L 5/001 |
| 9,882,681 B2* | 1/2018 | Sun | H04W 72/042 |
| 9,900,142 B2 | 2/2018 | Yi et al. | |
| 10,051,668 B2* | 8/2018 | Seo | H04L 5/001 |
| 2011/0317597 A1 | 12/2011 | Wan et al. | |
| 2012/0082157 A1 | 4/2012 | Yamada et al. | |
| 2012/0113827 A1 | 5/2012 | Yamada et al. | |
| 2012/0257552 A1 | 10/2012 | Chen et al. | |
| 2013/0114472 A1 | 5/2013 | Tamaki et al. | |
| 2013/0170406 A1 | 7/2013 | Kishiyama | |
| 2013/0294423 A1 | 11/2013 | Wang et al. | |
| 2013/0301503 A1 | 11/2013 | Park | |
| 2014/0022960 A1 | 1/2014 | Fu et al. | |
| 2014/0086112 A1 | 3/2014 | Stern-Berkowitz et al. | |
| 2014/0133373 A1 | 5/2014 | Han et al. | |
| 2014/0153449 A1 | 6/2014 | Seo et al. | |
| 2014/0293893 A1 | 10/2014 | Papasakellariou et al. | |
| 2015/0003304 A1 | 1/2015 | Wu et al. | |
| 2015/0085714 A1 | 3/2015 | Liang et al. | |
| 2015/0304087 A1 | 10/2015 | He et al. | |
| 2015/0341156 A1 | 11/2015 | Yang et al. | |

FOREIGN PATENT DOCUMENTS

| | | |
|---|---|---|
| WO | 2013016638 | 1/2013 |
| WO | 2014153751 A1 | 10/2014 |

OTHER PUBLICATIONS

Office Action issued for U.S. Appl. No. 13/946,983 dated Jun. 22, 2015.
Office Action issued for U.S. Appl. No. 13/946,983 dated Nov. 6, 2015.
Advisory Action issued for U.S. Appl. No. 13/946,983 dated Mar. 16, 2016.
Office Action issued for U.S. Appl. No. 13/946,983 dated Jul. 5, 2016.
Office Action issued for U.S. Appl. No. 13/946,983 dated Oct. 21, 2016.
Advisory Action issued for U.S. Appl. No. 13/946,983 dated Jan. 27, 2017.
Office Action issued for U.S. Appl. No. 13/946,983 dated Mar. 21, 2017.
Office Action issued for U.S. Appl. No. 13/946,983 dated Jul. 18, 2017.
Advisory Action issued for U.S. Appl. No. 13/946,983 dated Sep. 15, 2017.
Office Action issued for U.S. Appl. No. 13/946,983 dated Dec. 26, 2017.
Office Action issued for U.S. Appl. No. 13/946,983 dated Apr. 26, 2018.
Notice of Allowance issued for U.S. Appl. No. 13/946,983 dated Oct. 25, 2018.
3GPP TS 36.213 V11.4.0, Evolved Universal Terrestrial Radio Access (E-UTRA); Physical layer procedures (Release 11) Sep. 2013.
Nokia Corporation, Nokia Siemens Networks, "New WI: LTE TDD-FDD Joint Operation," 3GPP TSG RAN Meeting #60, RP-130862, Jun. 14, 2013.
3GPP TS 36.211 V113.0, Evolved Universal Terrestrial Radio Access (E-UTRA); Physical Channels and Modulation (Release 11) Jun. 2013.
3GPP TSG RAN WG1 Meeting #74bis, "Draft Report of 3GPP TSG RAN WG1 #74 V0.1.0 (Barcelona, Spain, Aug. 19-23, 2013)," Guangzhou, Oct. 11, 2013.
CMCC, "Email summary on FDD and TDD joint operation," 3GPP TSG-RAN WG1 #74, R1-133811, Aug. 23, 2013.
LG Electronics, "HARQ timing for TDD-FDD carrier aggregation," R1-134396, Oct. 11, 2013.
International Search Report issued for International Patent Application No. PCT/JP2014/003543 dated Jul. 3, 2014.
International Search Report issued for International Patent Application No. PCT/JP2014/003511 dated Jul. 1, 2014.
Office Action issued for U.S. Appl. No. 14/035,820 dated Nov. 10, 2015.
U.S. Appl. No. 61/843,755, "Aggregation of an FDD Carrier with a TDD Primary Carrier", filed Jul. 8, 2013.
Advisory Action issued for U.S. Appl. No. 14/035,820 dated Jun. 24, 2016.
Notice of Allowance issued for U.S. Appl. No. 14/035,820 dated Aug. 30, 2016.
Office Action issued for U.S. Appl. No. 14/035,820 dated Apr. 6, 2016.

* cited by examiner

| | First Case 1153a | Second Case 1153b | Third Case 1153c | Fourth Case 1153d | Fifth Case 1153e | Sixth Case 1153f | Seventh Case 1153g | Eighth Case 1153h |
|---|---|---|---|---|---|---|---|---|
| First Cell (PCell) 1151a | FDD | TDD | TDD | FDD | TDD | FDD | FDD | TDD |
| Second Cell (PUCCH Reporting Cell) 1151b | FDD | TDD | FDD | FDD | FDD | TDD | TDD | TDD |
| Third Cell (SCell) 1151c | FDD | TDD | TDD | TDD | FDD | FDD | TDD | FDD |

FIG. 11

SYSTEMS AND METHODS FOR CARRIER AGGREGATION

RELATED APPLICATIONS

This application is a continuation of U.S. patent application Ser. No. 13/946,983 entitled "SYSTEMS AND METHODS FOR CARRIER AGGREGATION," filed Jul. 19, 2013, now U.S. Pat. No. 10,237,020 issued Mar. 19, 2019, which is hereby incorporated herein by reference in its entirety.

TECHNICAL FIELD

The present disclosure relates generally to communication systems. More specifically, the present disclosure relates to systems and methods for carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 11 illustrates various cases of carrier aggregation with PUCCH reporting with a configured PUCCH reporting cell;

DETAILED DESCRIPTION

Figure 1:
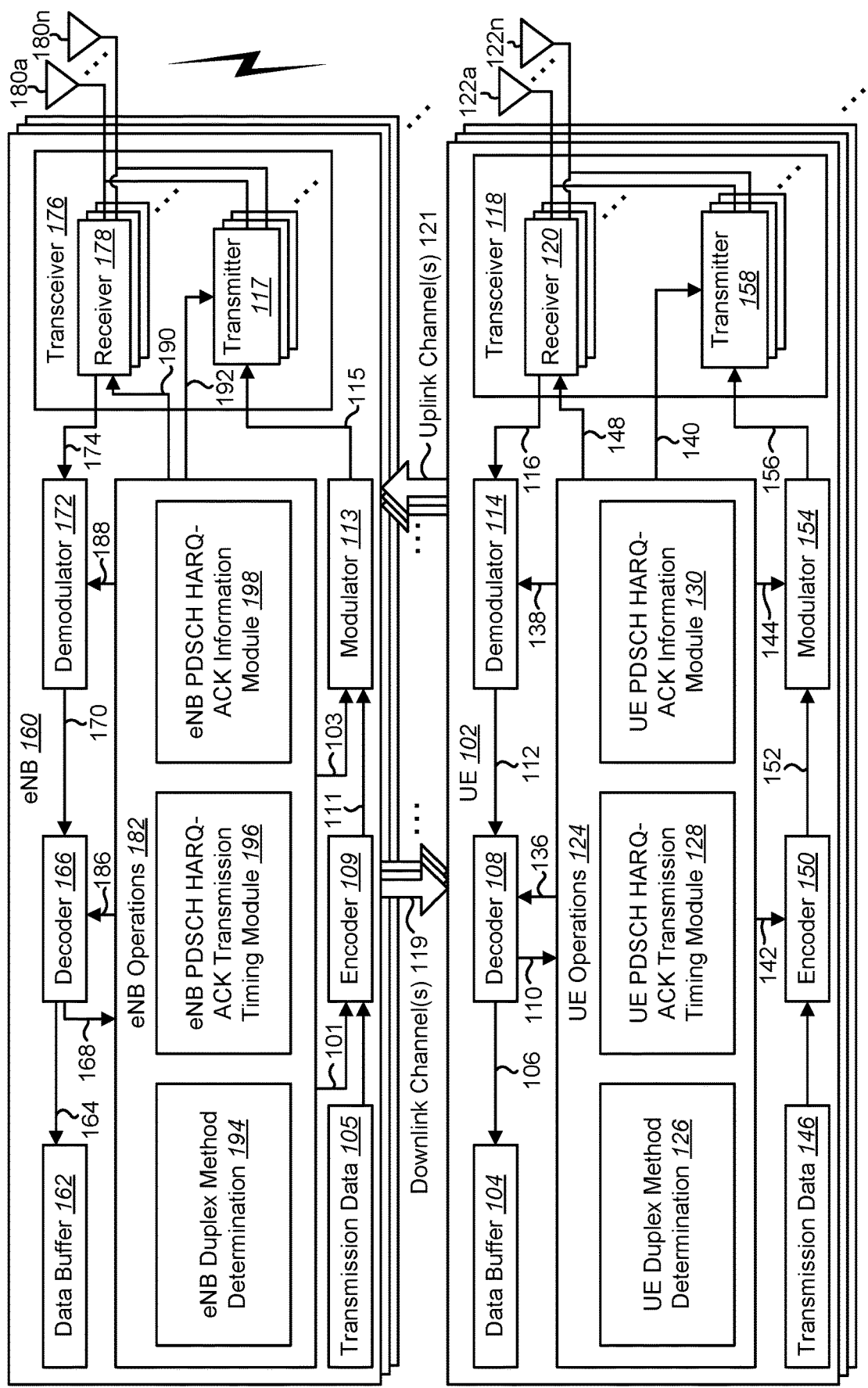
FIG. 1 is a block diagram illustrating one implementation of one or more evolved Node Bs (eNBs) and one or more User Equipments (UEs) in which systems and methods for carrier aggregation may be implemented.

A UE for performing carrier aggregation is described. The UE includes a processor and memory that is in electronic communication with the processor. Executable instructions are stored in the memory. The UE determines a duplex method of each serving cell for frequency-division duplexing (FDD) and time-division duplexing (TDD) carrier aggregation. At least one serving cell is a TDD cell and at least one serving cell is a FDD cell. The UE also determines physical downlink shared channel (PDSCH) Hybrid Automatic Repeat Request Acknowledgement/Negative Acknowledgement (HARQ-ACK) transmission timing for a serving cell. When a primary cell is a TDD cell, the PDSCH HARQ-ACK transmission timing for the serving cell is determined based on a downlink (DL) association set for the serving cell. The UE further sends PDSCH HARQ-ACK information based on the PDSCH HARQ-ACK transmission timing.

When the primary cell is a FDD cell, the PDSCH HARQ-ACK transmission timing for the serving cell may be determined upon detection of a PDSCH transmission in an earlier subframe intended for the UE and for which the PDSCH HARQ-ACK information is sent in a later subframe.

When the primary cell is a TDD cell, the serving cell is a FDD cell and the serving cell is a secondary cell, the DL association set for the serving cell may be determined based on a DL-reference uplink/downlink (UL/DL) configuration of the primary cell. Determining the DL association set for the serving cell may include obtaining the DL association set for the serving cell by a table for a FDD cell DL association set using the DL-reference UL/DL configuration of the primary cell as an input of the table. The DL association set may be a superset of a TDD DL association set of the DL-reference UL/DL configuration of the primary cell. The DL association set may be further optimized to more evenly distribute subframes in the DL association set.

When the primary cell is a TDD cell, the serving cell is a TDD cell and the serving cell is a secondary cell, the DL association set for the serving cell may be determined based on a DL-reference UL/DL configuration of the serving cell. The DL-reference UL/DL configuration of the serving cell may be determined based on a TDD UL/DL configuration of the primary cell and a TDD UL/DL configuration of the serving cell.

When a physical uplink control channel (PUCCH) reporting cell is configured and the PUCCH reporting cell is a FDD cell, the PDSCH HARQ-ACK transmission timing for the serving cell may be determined upon detection of a PDSCH transmission in an earlier subframe intended for the UE and for which the PDSCH HARQ-ACK information is sent in a later subframe.

When a PUCCH reporting cell is configured and the PUCCH reporting cell is a TDD cell, and the serving cell is a FDD cell, the DL association set for the serving cell may be determined based on the DL-reference UL/DL configuration of the PUCCH reporting cell. Determining the DL association set for the serving cell may include obtaining the DL association set for the serving cell by a table for a FDD cell DL association set using the DL-reference UL/DL configuration of the PUCCH reporting cell as an input of the table. The DL association set may be a superset of a TDD DL association set of the DL-reference UL/DL configuration of the PUCCH reporting cell. The DL association set may be further optimized to more evenly distribute subframes in the DL association set.

When a PUCCH reporting cell is configured and the PUCCH reporting cell is a TDD cell, and the serving cell is a TDD cell, the DL association set for the serving cell may be determined based on a DL-reference UL/DL configuration of the serving cell. The DL-reference UL/DL configuration of the serving cell may be determined based on a TDD UL/DL configuration of the PUCCH reporting cell and a TDD UL/DL configuration of the serving cell.

The UE may also aggregate the PDSCH HARQ-ACK information of each serving cell. The UE may further send the aggregated PDSCH HARQ-ACK information on one of a PUCCH or a physical uplink shared channel (PUSCH).

An eNB for performing carrier aggregation is also described. The eNB includes a processor and memory that is in electronic communication with the processor. Executable instructions are stored in the memory. The eNB determines a duplex method of each serving cell for FDD and TDD carrier aggregation. At least one serving cell is a TDD cell and at least one serving cell is a FDD cell. The eNB also determines PDSCH HARQ-ACK transmission timing for a serving cell. When a primary cell is a TDD cell the PDSCH HARQ-ACK transmission timing for the serving cell is determined based on a DL association set for the serving cell. The eNB further receives PDSCH HARQ-ACK information based on the PDSCH HARQ-ACK transmission timing.

When the primary cell is a FDD cell, the PDSCH HARQ-ACK transmission timing for the serving cell may be determined based on a PDSCH transmission in an earlier subframe intended for a UE and for which the PDSCH HARQ-ACK information is received in a later subframe.

When the primary cell is a TDD cell, the serving cell is a FDD cell and the serving cell is a secondary cell, the DL association set for the serving cell may be determined based on a DL-reference UL/DL configuration of the primary cell. Determining the DL association set for the serving cell may include obtaining the DL association set for the serving cell by a table for a FDD cell DL association set using the DL-reference UL/DL configuration of the primary cell as an input of the table. The DL association set may be a superset of a TDD DL association set of the DL-reference UL/DL configuration of the primary cell. The DL association set may be further optimized to more evenly distribute subframes in the DL association set.

When the primary cell is a TDD cell, the serving cell is a TDD cell and the serving cell is a secondary cell, the DL association set for the serving cell may be determined based on a DL-reference UL/DL configuration of the serving cell. The DL-reference UL/DL configuration of the serving cell may be determined based on a TDD UL/DL configuration of the primary cell and a TDD UL/DL configuration of the serving cell.

When a PUCCH reporting cell is configured and the PUCCH reporting cell is a FDD cell, the PDSCH HARQ-ACK transmission timing for the serving cell may be determined based on a PDSCH transmission in an earlier subframe intended for a UE and for which the PDSCH HARQ-ACK information is received in a later subframe.

When a PUCCH reporting cell is configured and the PUCCH reporting cell is a TDD cell, and the serving cell is a FDD cell, the DL association set for the serving cell may be determined based on the DL-reference UL/DL configuration of the PUCCH reporting cell. Determining the DL association set for the serving cell may include obtaining the DL association set for the serving cell by a table for a FDD cell DL association set using the DL-reference UL/DL configuration of the PUCCH reporting cell as an input of the table. The DL association set may be a superset of a TDD DL association set of the DL-reference UL/DL configuration of the PUCCH reporting cell. The DL association set may be further optimized to more evenly distribute subframes in the DL association set.

When a PUCCH reporting cell is configured and the PUCCH reporting cell is a TDD cell, and the serving cell is a TDD cell, the DL association set for the serving cell may be determined based on a DL-reference UL/DL configuration of the serving cell. The DL-reference UL/DL configuration of the serving cell may be determined based on a TDD UL/DL configuration of the PUCCH reporting cell and a TDD UL/DL configuration of the serving cell.

The eNB may also receive aggregated PDSCH HARQ-ACK information on one of a PUCCH or a PUSCH. The aggregated PDSCH HARQ-ACK information may include PDSCH HARQ-ACK information of each serving cell.

A method for performing carrier aggregation by a UE is also described. The method includes determining a duplex method of each serving cell for FDD and TDD carrier aggregation. At least one serving cell is a TDD cell and at least one serving cell is a FDD cell. The method also includes determining PDSCH HARQ-ACK transmission timing for a serving cell. When a primary cell is a TDD cell, the PDSCH HARQ-ACK transmission timing for the serving cell is determined based on a DL association set for the serving cell. The method further includes sending PDSCH HARQ-ACK information based on the PDSCH HARQ-ACK transmission timing.

A method for performing carrier aggregation by an eNB is also described. The method includes determining a duplex method of each serving cell for FDD and TDD carrier aggregation. At least one serving cell is a TDD cell and at least one serving cell is a FDD cell. The method also includes determining PDSCH HARQ-ACK transmission timing for a serving cell. When a primary cell is a TDD cell, the PDSCH HARQ-ACK transmission timing for the serving cell is determined based on a DL association set for the serving cell. The method further includes receiving PDSCH HARQ-ACK information based on the PDSCH HARQ-ACK transmission timing.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe carrier aggregation. In some implementations, the systems and methods disclosed herein describe LTE enhanced carrier aggregation (eCA) with hybrid duplexing. In particular, the systems and methods describe downlink (DL) association sets and PDSCH HARQ-ACK transmission timings that may be used in time division duplexing (TDD) and frequency division duplexing (FDD) carrier aggregation (CA). In one case, a primary cell (PCell) may report uplink control information (UCI). In another case, a secondary cell (SCell) may be configured as a reporting cell for the UCI.

Currently, there are two LTE duplex systems, FDD and TDD. However, under current approaches, FDD and TDD systems cannot work together for CA. For example, under known approaches (e.g., LTE Release-10 (hereafter "Release-10") and LTE Release-11 (hereafter "Release-11")), carrier aggregation (CA) is allowed for either multiple FDD cells (e.g., FDD serving cells), or multiple TDD cells (e.g., TDD serving cells), but not a hybrid of both types of cells.

Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load. However, CA in a hybrid duplexing network (e.g., a network with both FDD and TDD cells) is not supported in any current approach.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

A FDD cell requires spectrum (e.g., radio communication frequencies or channels) in which contiguous subsets of the spectrum are entirely allocated to either UL or DL but not both. Accordingly, FDD may have carrier frequencies that are paired (e.g., paired DL and UL carrier frequencies). However, TDD does not require paired channels. Instead, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL/DL configurations and dynamic UL/DL re-configuration.

The systems and methods described herein include carrier aggregation (CA) under the same scheduler control, with a macro cell and a small cell (e.g., femtocell, picocell, microcell, etc.) heterogeneous network scenario. For the LTE network deployment, most carriers choose FDD-LTE. However, TDD-LTE is becoming more and more important in many markets. A TDD implementation may provide flexibility for small cells with fast traffic adaptation.

With TDD CA and hybrid duplexing networks, the macro cells and pico/small cells may use different frequency bands. A frequency band is a small section of the spectrum, in which communication channels may be established. For example, in a typical CA case, the macro cell may use a lower frequency band and the pico/small cell may use a higher frequency band. For hybrid duplexing networks, a possible combination is to have FDD on a macro cell and TDD on a pico/small cell.

The systems and methods disclosed herein provide association timings to allow seamless operation of TDD and FDD carrier aggregation. In one example, a PCell may be configured with FDD and an SCell may be configured with TDD. In another example, a PCell may be configured with TDD, and an SCell may be configured with FDD.

Multiple implementations are provided for association timings in the case where a TDD PCell or reporting cell is used for UCI reporting (e.g., sending PDSCH HARQ-ACK information). In one implementation, a FDD DL association set (e.g., a FDD cell DL association set or a DL association set for a FDD cell) may be mapped to the closest UL in the DL-reference UL/DL configuration of the reporting TDD cell. In another implementation, an association region or association window for a FDD cell may be defined based on the DL-reference UL/DL configuration of the PUCCH reporting cell, so that the TDD downlink association set is a subset of the association window of the FDD cell. In yet another implementation, an association region or association window for a FDD cell may be defined based on the DL-reference UL/DL configuration of the PUCCH reporting cell, so that the subframes of a FDD cell are more evenly associated with the UL subframes of the PUCCH reporting cell.

If a DL-reference UL/DL configuration of a TDD cell is used to report PDSCH HARQ-ACK in FDD and TDD carrier aggregation, a regional mapping or association window may be applied on FDD cell(s) for the PDSCH HARQ-ACK transmission timing based on a DL-reference UL/DL configuration. If the PCell is a TDD cell, the DL-reference UL/DL configuration of the PCell may be used to determine the DL association set for the PDSCH HARQ-ACK transmission timing of FDD cells.

If a TDD cell is configured as the PUCCH reporting cell (which may be referred to as the reference cell) for PDSCH HARQ-ACK reporting, the DL-reference UL/DL configuration of the PUCCH reporting cell may be used to determine the DL association set for the PDSCH HARQ-ACK transmission timing. The DL-reference UL/DL configuration of the PUCCH reporting cell may be the TDD UL/DL configuration of the PUCCH reporting cell. The DL-reference UL/DL configuration of the PUCCH reporting cell may be derived by the TDD configuration of the primary cell and the PUCCH reporting cell.

The PDSCH HARQ-ACK information of FDD and TDD cells may be aggregated and reported on an uplink subframe. If a DL-reference UL/DL configuration is used to report PDSCH HARQ-ACK in FDD and TDD carrier aggregation, the PDSCH HARQ-ACK information of the FDD and TDD cells may be aggregated based on a DL association set of each cell and/or a DL-reference UL/DL configuration of each cell.

The systems and methods disclosed herein may provide the following benefits. CA in a hybrid duplexing network that includes FDD and TDD cells may operate seamlessly. Resource use may be flexible when both FDD and TDD are used by a UE. HARQ-ACK reporting methods may support the dynamic UL/DL reconfiguration of TDD cells. TDD cell association timings may be extended to FDD cells in a TDD and FDD CA scenario. Additionally, PUCCH reporting cell (e.g., reference cell) configuration by physical (PHY) layer signaling, implicit signaling and/or higher layer signaling may be supported.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for carrier aggregation may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE duplex method determination module 126, a UE PDSCH HARQ-ACK transmission timing module 128 and a UE PDSCH HARQ-ACK information module 130.

A UE duplex method determination module 126 may determine a duplex method of each serving cell for FDD and TDD carrier aggregation. The UE 102 may be located in a wireless communication network in which carrier aggregation may be performed with one or more FDD cells and one or more TDD cells. In one implementation, the wireless communication network may be an LTE network.

The UE 102 may communicate with an eNB 160 over a serving cell using either FDD or TDD duplexing. The UE duplex method determination module 126 may determine the duplex method of each of the configured serving cells used in FDD and TDD carrier aggregation. In other words, the UE duplex method determination module 126 may determine whether a serving cell is a FDD cell or a TDD cell.

The UE PDSCH HARQ-ACK transmission timing module 128 may determine PDSCH HARQ-ACK transmission timing for a serving cell. A TDD cell may follow a DL-reference UL/DL configuration of the TDD cell for the DL association set and the PDSCH HARQ-ACK timing. For example, the DL association set may be determined based on the DL-reference UL/DL configuration. The DL association set then may define the PDSCH HARQ-ACK timing of the serving cell.

However, for a FDD cell, a FDD DL association set may be defined for all seven TDD UL/DL configurations. Therefore, when FDD and TDD CA is used, and a TDD cell is the PCell or the PUCCH reporting cell for PDSCH HARQ-ACK feedback, the one or more FDD serving cells may use the FDD DL association set determined according to the DL-reference UL/DL configuration of the PCell and/or the PUCCH reporting cell.

In one case, the PUCCH is transmitted only on a primary cell (PCell). In this case, the PCell may be either a FDD cell or a TDD cell. In one scenario, a FDD cell is the PCell. In this scenario, all cells (including FDD and TDD secondary cells (SCells)) may follow the FDD timing of the PCell. The PDSCH transmission in subframe n−4 may be acknowledged in subframe n. The PDSCH HARQ-ACK information of all cells may be aggregated and reported on the PUCCH of the PCell or a PUSCH with the lowest Cell_ID.

In another scenario, a TDD cell is the PCell. In this scenario, the PDSCH HARQ-ACK information of all serving cells may be aggregated and reported on the PUCCH of the PCell or a PUSCH with the lowest Cell_ID. The DL association set and PDSCH HARQ-ACK transmission timing of an aggregated cell may follow a DL-reference UL/DL configuration. In one implementation, the DL-reference UL/DL configuration of the TDD PCell is the PCell UL/DL configuration (e.g., the TDD UL/DL configuration of the PCell). The DL-reference UL/DL configuration of the PCell may be used to determine the DL association set of the PCell. The UE PDSCH HARQ-ACK transmission timing module 128 may determine the PDSCH HARQ-ACK transmission timing for the TDD PCell based on the DL association set of the TDD PCell.

In another implementation, the DL-reference UL/DL configuration of a TDD SCell may be determined by the combination of the PCell UL/DL configuration and the SCell UL/DL configuration following Table (4) as describe below in connection with FIG. 5. The DL-reference UL/DL configuration of the TDD SCell may be used to determine the DL association set of the TDD SCell. The UE PDSCH HARQ-ACK transmission timing module 128 may determine the PDSCH HARQ-ACK transmission timing of the TDD SCell based on the DL association set of the TDD SCell.

In yet another implementation, the DL association set of a FDD SCell may be determined by the UE PDSCH HARQ-ACK transmission timing module 128 based on a DL-reference UL/DL configuration of the primary cell. The DL association set for the FDD SCell may be obtained by a table for a FDD cell DL association set using the DL-reference UL/DL configuration of the primary cell as an input of the table, as described below in connection with FIGS. 7A-7B. The DL association set of the FDD cell may be a superset of a TDD DL association set (e.g., a TDD cell DL association set or a DL association set of a TDD cell) of the DL-reference UL/DL configuration of the primary cell, as described below in connection with FIGS. 8A-8B. Furthermore, the DL association set of the FDD cell may be optimized to more evenly distribute subframes in the DL association set, as described below in connection with FIG. 9.

In another case, the PUCCH is transmitted on a configured PUCCH reporting cell. In this case, PUCCH reporting on a SCell may be configured. A FDD cell or a TDD cell may be configured as the PUCCH reporting cell.

In one scenario, a FDD cell may be configured as the PUCCH reporting cell. In this scenario, all cells (including FDD and TDD secondary cells (SCells)) may follow the FDD timing of the PUCCH reporting cell. The PDSCH transmission in subframe n−4 may be acknowledged in subframe n.

In another scenario, a TDD cell may be configured as the PUCCH reporting cell. In this scenario, the PDSCH HARQ-ACK information of all serving cells may be aggregated and reported on the PUCCH of the PUCCH reporting cell or a PUSCH with the lowest Cell_ID. The DL association set and PDSCH HARQ-ACK transmission timing of an aggregated cell may follow a DL-reference UL/DL configuration. In one implementation, the DL-reference UL/DL configuration of the PUCCH reporting cell is the TDD UL/DL configuration of the PUCCH reporting cell. The DL-reference UL/DL configuration of the PUCCH reporting cell may be used to determine the DL association set of the PUCCH reporting cell. The UE PDSCH HARQ-ACK transmission timing module 128 may determine the PDSCH HARQ-ACK transmission timing based on the DL association set of the PUCCH reporting cell.

In another implementation, the DL-reference UL/DL configuration of a TDD cell other than the PUCCH reporting cell (e.g., a TDD PCell or SCell) may be determined by the combination of the PUCCH reporting cell UL/DL configuration and the TDD cell UL/DL configuration following Table (4) as describe below in connection with FIG. 5 by using the TDD PUCCH reporting cell UL/DL configuration as the PCell UL/DL configuration and the TDD cell UL/DL configuration as the SCell UL/DL configuration. The DL-reference UL/DL configuration of the TDD cell may be used for the DL association set of the TDD cell. The UE PDSCH HARQ-ACK transmission timing module 128 may determine the PDSCH HARQ-ACK transmission timing for the TDD cell based on the DL association set of the TDD cell.

In yet another implementation, the DL association set of a FDD SCell may be determined based on a DL-reference UL/DL configuration of the PUCCH reporting cell. The DL association set for the FDD SCell may be obtained from a table for a FDD cell DL association set using the DL-reference UL/DL configuration of the PUCCH reporting cell as an input of the table, as described below in connection with FIGS. 7A-7B. The FDD DL association set may be a superset of a TDD DL association set of the DL-reference UL/DL configuration of the PUCCH reporting cell, as described below in connection with FIGS. 8A-8B. Furthermore, the DL association set may be optimized to more evenly distribute subframes in the DL association set, as described below in connection with FIG. 9.

It should be noted that in all cases, if a TDD cell is configured with dynamic UL/DL reconfiguration with traffic adaptation (e.g., the TDD cell is an eIMTA cell), then the DL-reference UL/DL configuration used in CA may be based on the DL-reference UL/DL configuration of the eIMTA cell. Therefore, a DL-reference UL/DL configuration of the eIMTA cell may be used by the UE PDSCH HARQ-ACK transmission timing module 128 to determine the PDSCH HARQ-ACK transmission timing for each serving cell for FDD and TDD carrier aggregation.

The UE PDSCH HARQ-ACK information module 130 may send PDSCH HARQ-ACK information based on the PDSCH HARQ-ACK transmission timing. For example, the UE PDSCH HARQ-ACK information module 130 may send PDSCH HARQ-ACK information in a transmission uplink subframe corresponding to a DL association set of the serving cell. The UE PDSCH HARQ-ACK information module 130 may send the PDSCH HARQ-ACK information on a PUCCH or a PUSCH.

In the case where PUCCH is transmitted only on a primary cell, the UE PDSCH HARQ-ACK information module 130 may send PDSCH HARQ-ACK information on the PUCCH of the primary cell or the PUSCH with the lowest Cell_ID. In one implementation, the UE PDSCH HARQ-ACK information module 130 may aggregate and send the PDSCH HARQ-ACK information of each serving cell on the PUCCH of the PCell or a PUSCH with the lowest Cell_ID.

In the case where PUCCH is transmitted on a configured PUCCH reporting cell, the UE PDSCH HARQ-ACK information module 130 may send PDSCH HARQ-ACK information on the PUCCH of the PUCCH reporting cell or the PUSCH with the lowest Cell_ID. In one implementation, the UE PDSCH HARQ-ACK information module 130 may aggregate and send the PDSCH HARQ-ACK information of each serving cell on the PUCCH of the PUCCH reporting cell or a PUSCH with the lowest Cell_ID.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some implementations, this may be based on the PDSCH HARQ-ACK transmission timing determined by the UE PDSCH HARQ-ACK transmission timing module 128. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB duplex method determination module 194, an eNB PDSCH HARQ-ACK transmission timing module 196 and an eNB PDSCH HARQ-ACK information module 198.

The eNB duplex method determination module 194 may determine a duplex method of each serving cell for FDD and TDD carrier aggregation. The eNB 160 may communicate with a UE 102 over a serving cell using either FDD or TDD duplexing. The eNB duplex method determination module 194 may determine the duplex method of each of the configured serving cells used in FDD and TDD carrier aggregation. In other words, the eNB duplex method determination module 194 may determine whether a serving cell is a FDD cell or a TDD cell.

The eNB PDSCH HARQ-ACK transmission timing module 196 may determine PDSCH HARQ-ACK transmission timing for a serving cell. In one case, the PUCCH is transmitted only on a primary cell (PCell). In this case, the PCell may be either an FDD cell or a TDD cell.

In one scenario, a FDD cell is the PCell. In this scenario, all cells (including FDD and TDD secondary cells (SCells)) may follow the FDD timing of the PCell. The PDSCH transmission in subframe n-4 may be acknowledged in subframe n. The PDSCH HARQ-ACK information of all cells may be aggregated and reported on the PUCCH of the PCell or a PUSCH with the lowest Cell_ID.

In another scenario, a TDD cell is the PCell. In this scenario, the PDSCH HARQ-ACK information of all serving cells may be aggregated and reported on the PUCCH of the PCell or a PUSCH with the lowest Cell_ID. The DL association set and PDSCH HARQ-ACK transmission timing of an aggregated cell may follow a DL-reference UL/DL configuration of the cell.

In one implementation, the DL-reference UL/DL configuration of the TDD PCell is the PCell UL/DL configuration. The DL-reference UL/DL configuration may be used to determine the DL association set. The eNB PDSCH HARQ-ACK transmission timing module 196 may determine the PDSCH HARQ-ACK transmission timing for the TDD PCell based on the DL association set of the TDD PCell.

In another implementation, the DL-reference UL/DL configuration of a TDD SCell may be determined by the combination of the PCell UL/DL configuration and the SCell UL/DL configuration following Table (4) as described below in connection with FIG. 5. The DL-reference UL/DL configuration of the TDD SCell may be used to determine the DL association set of the TDD SCell. The eNB PDSCH HARQ-ACK transmission timing module 196 may determine the PDSCH HARQ-ACK transmission timing of the TDD SCell based on the DL association set of the TDD SCell.

In yet another implementation, the DL association set of a FDD SCell is determined by the eNB PDSCH HARQ-ACK transmission timing module 196 based on a DL-reference UL/DL configuration of the primary cell. The DL association set for the FDD SCell may be obtained by a table for a FDD cell DL association set using the DL-reference UL/DL configuration of the primary cell as an input of the table, as described below in connection with FIGS. 7A-7B. The DL association set of the FDD cell may be a superset of a TDD DL association set of the DL-reference UL/DL configuration of the primary cell, as described below in connection with FIGS. 8A-8B. Furthermore, the DL association set of the FDD cell may be optimized to more evenly distribute subframes in the DL association set, as described below in connection with FIG. 9.

In another case, the PUCCH is transmitted on a configured PUCCH reporting cell. In this case, PUCCH reporting on a SCell may be configured. A FDD cell or a TDD cell may be configured as the PUCCH reporting cell.

In one scenario, a FDD cell may be configured as the PUCCH reporting cell. In this scenario, all cells (including FDD and TDD secondary cells (SCells)) may follow the FDD timing of the PUCCH reporting cell. The PDSCH transmission in subframe n-4 may be acknowledged in subframe n.

In another scenario, a TDD cell may be configured as the PUCCH reporting cell. In this scenario, the PDSCH HARQ-ACK information of all serving cells may be aggregated and reported on the PUCCH of the PUCCH reporting cell or a PUSCH with the lowest Cell_ID.

In one implementation, the DL-reference UL/DL configuration of the PUCCH reporting cell is the UL/DL configuration of the PUCCH reporting cell. The DL-reference UL/DL configuration of the PUCCH reporting cell may be used to determine the DL association set of the PUCCH reporting cell. The eNB PDSCH HARQ-ACK transmission timing module 196 may determine the PDSCH HARQ-ACK transmission timing based on the DL association set of the PUCCH reporting cell.

In another implementation, the DL-reference UL/DL configuration of a TDD cell other than the PUCCH reporting cell (e.g., a TDD PCell or SCell) may be determined by the combination of the PUCCH reporting cell UL/DL configuration and the TDD cell UL/DL configuration following Table (4) as describe below in connection with FIG. 5 by using the TDD PUCCH reporting cell UL/DL configuration as the PCell UL/DL configuration and the TDD cell UL/DL configuration as the SCell UL/DL configuration. The DL-reference UL/DL configuration of the TDD cell may be used to determine the DL association set of the TDD cell. The eNB PDSCH HARQ-ACK transmission timing module 196 may determine the PDSCH HARQ-ACK transmission timing for the TDD cell based on the DL association set of the TDD cell.

In yet another implementation, the DL association set of a FDD SCell may be determined based on a DL-reference UL/DL configuration of the PUCCH reporting cell. The DL association set for the FDD SCell may be obtained from a table for a FDD cell DL association set using the DL-reference UL/DL configuration of the PUCCH reporting cell as an input of the table, as described below in connection with FIGS. 7A-7B. The DL association set may be a superset of a TDD DL association set of the DL-reference UL/DL configuration of the PUCCH reporting cell, as described below in connection with FIGS. 8A-8B. Furthermore, the DL association set may be optimized to more evenly distribute subframes in the DL association set, as described below in connection with FIG. 9.

It should be noted that in all cases, if a TDD cell is configured with dynamic UL/DL reconfiguration with traffic adaptation (e.g., the TDD cell is an eIMTA cell), then the DL-reference UL/DL configuration used in CA may be based on the DL-reference UL/DL configuration of the eIMTA cell. Therefore, a DL-reference UL/DL configuration of the eIMTA cell may be used by the eNB PDSCH HARQ-ACK transmission timing module 196 to determine the PDSCH HARQ-ACK transmission timing for each serving cell for FDD and TDD carrier aggregation.

The eNB PDSCH HARQ-ACK information module 198 may receive PDSCH HARQ-ACK information based on the PDSCH HARQ-ACK transmission timing. For example, the eNB PDSCH HARQ-ACK information module 198 may receive PDSCH HARQ-ACK information in a transmission uplink subframe corresponding to a DL association set of the serving cell. The eNB PDSCH HARQ-ACK information module 198 may receive the PDSCH HARQ-ACK information on a PUCCH or a PUSCH.

In the case where PUCCH is transmitted only on a primary cell (e.g., PUCCH reporting cell is not configured), the eNB PDSCH HARQ-ACK information module 198 may receive PDSCH HARQ-ACK information on the PUCCH of the primary cell or the PUSCH with the lowest Cell_ID. In one implementation, the eNB PDSCH HARQ-ACK information module 198 may receive aggregated PDSCH HARQ-ACK information of each serving cell on the PUCCH of the PCell or a PUSCH with the lowest Cell_ID.

In the case where PUCCH is transmitted on a configured PUCCH reporting cell, the eNB PDSCH HARQ-ACK information module 198 may receive PDSCH HARQ-ACK information on the PUCCH of the PUCCH reporting cell or the PUSCH with the lowest Cell_ID. In one implementation, the eNB PDSCH HARQ-ACK information module 198 may receive aggregated PDSCH HARQ-ACK information of each serving cell on the PUCCH of the PUCCH reporting cell or a PUSCH with the lowest Cell_ID.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a DL association set and PDSCH HARQ-ACK transmission timing. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
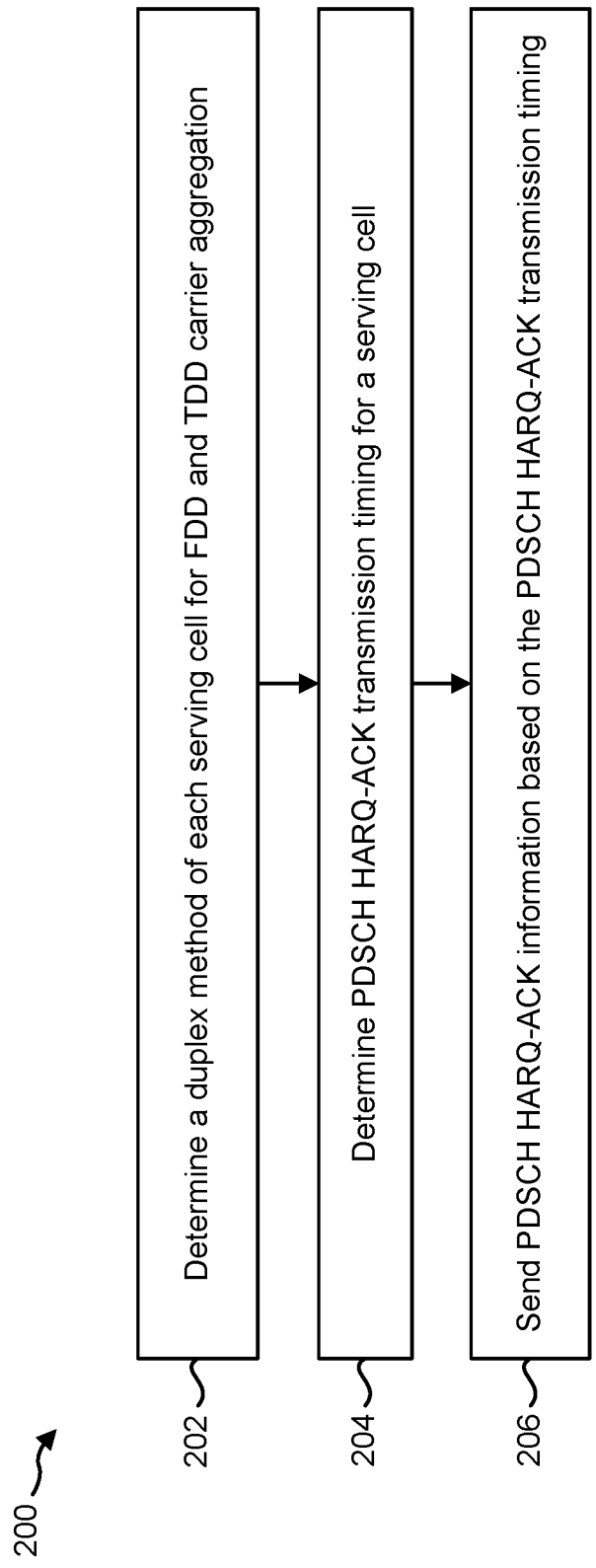
FIG. 2 is a flow diagram illustrating one implementation of a method for performing carrier aggregation by a UE.

FIG. 2 is a flow diagram illustrating one implementation of a method 200 for performing carrier aggregation by a UE 102. A UE 102 may determine 202 a duplex method of each serving cell for FDD and TDD carrier aggregation. The UE 102 may be located in a wireless communication network in which carrier aggregation may be performed with one or more FDD cells and one or more TDD cells. In one implementation, the wireless communication network may be an LTE network.

The UE 102 may communicate with an eNB 160 over a serving cell using either FDD or TDD duplexing. A serving cell may be a set of communication channels 119, 121. During carrier aggregation (CA), more than one serving cell may be aggregated to a UE 102. The UE 102 may determine 202 the duplex method of each of the configured serving cells used in FDD and TDD carrier aggregation. In other words, the UE 102 may determine 202 whether a serving cell is a FDD cell or a TDD cell.

The UE 102 may determine 204 PDSCH HARQ-ACK transmission timing for a serving cell. The PDSCH HARQ-ACK reporting for FDD and TDD networks are very different. With FDD, the HARQ-ACK for a PDSCH transmission in subframe n may be reported in subframe n+4 on a PUCCH or PUSCH transmission. However, with TDD, the PDSCH HARQ-ACK may only be reported on subframes with a UL allocation.

Therefore, with TDD, a UL subframe may be associated with more than one DL subframe for PDSCH HARQ-ACK reporting. Accordingly, multi-cell HARQ-ACK reporting for CA in hybrid duplexing networks may be specified.

For a TDD cell, the downlink association set and PDSCH HARQ-ACK reporting timing are well defined for all TDD UL/DL configurations. A TDD cell may follow a DL-reference UL/DL configuration of the cell for the downlink association set and the PDSCH HARQ-ACK timing. The downlink association set may be determined based on the DL-reference UL/DL configuration. The downlink association set then defines the PDSCH HARQ-ACK timing.

However, for a FDD cell, a DL may exist in every subframe, but there are no existing TDD UL/DL configurations that can report all subframes as DL. Therefore, a new downlink association set may be defined for a FDD cell. The FDD downlink association set may be defined for all seven TDD UL/DL configurations. Therefore, when FDD and TDD CA is used, and a TDD cell is the PCell or the PUCCH reporting cell for PDSCH HARQ-ACK feedback, the one or more FDD serving cells may use the FDD DL association set determined according to the DL-reference UL/DL configuration of the PCell and/or the PUCCH reporting TDD cell.

A downlink association set for a FDD cell may be used for non-carrier aggregation operation. For example, normal (e.g., non-carrier aggregation) FDD PDSCH HARQ-ACK transmission timing (e.g., a PDSCH transmission in subframe n−4 and a HARQ-ACK transmission in subframe n) may be replaced by the downlink association set for a FDD cell. Therefore, whether the UE 102 uses the downlink association set for a FDD cell or a fixed 4 milliseconds (ms) PDSCH HARQ-ACK timing may be configured by a higher layer. This approach may provide for a subframe that is free of PUCCH resources.

In one case, the PUCCH is transmitted only on a primary cell. In this case, the primary cell may be either an FDD cell or a TDD cell. If a FDD cell is the primary cell (PCell), all cells (including FDD and TDD secondary cells (SCells)) may follow the FDD timing of the PCell. In this scenario (where a FDD cell is the PCell) a TDD cell may be viewed as a half-duplex FDD cell (e.g., with a fixed 4 ms delay). The PDSCH transmission in subframe n−4 may be acknowledged in subframe n. The PDSCH HARQ-ACK information of all cells may be aggregated and reported on the PUCCH of the PCell or a PUSCH with the lowest Cell_ID. Therefore, if the serving cell is a FDD cell and the serving cell is a primary cell or if the serving cell is a secondary cell and a primary cell is a FDD cell, the UE 102 may determine 204 a PDSCH HARQ-ACK transmission timing for the serving cell upon detection of a PDSCH transmission in an earlier subframe (e.g., n−4) intended for the UE 102. The PDSCH HARQ-ACK information may be sent in a later subframe (e.g., n).

In another scenario, a TDD cell is the PCell. In this scenario, the PDSCH HARQ-ACK information of all serving cells may be aggregated and reported on the PUCCH of the PCell or a PUSCH with the lowest Cell_ID. The DL association set and PDSCH HARQ-ACK transmission timing of an aggregated cell may follow a DL-reference UL/DL configuration of the cell.

In one implementation, the DL-reference UL/DL configuration of the TDD PCell is the PCell UL/DL configuration. The DL-reference UL/DL configuration of the TDD PCell may be used to determine the DL association set of the TDD PCell. The UE 102 may determine 204 the PDSCH HARQ-ACK transmission timing of the TDD PCell based on the DL association set of the TDD PCell.

In another implementation, the DL-reference UL/DL configuration of a TDD SCell may be determined by the combination of the PCell UL/DL configuration and the SCell UL/DL configuration following Table (4) as described below in connection with FIG. 5. The DL-reference UL/DL configuration of the TDD SCell may be used to determine the DL association set of the TDD SCell. The UE 102 may determine 204 the PDSCH HARQ-ACK transmission timing of the TDD SCell based on the DL association set of the TDD SCell. Therefore, when the primary cell is a TDD cell, the serving cell is a TDD cell and the serving cell is a secondary cell, the DL association set for the serving cell is determined based on a DL-reference UL/DL configuration of the serving cell. The DL-reference UL/DL configuration of the serving cell is determined based on a TDD UL/DL configuration of the primary cell and a TDD UL/DL configuration of the serving cell.

In yet another implementation, the DL association set of a FDD SCell is determined based on a DL-reference UL/DL configuration of the primary cell. The DL association set of the FDD SCell may be obtained by a table for a FDD cell DL association set using the DL-reference UL/DL configuration of the primary cell as an input of the table, as described below in connection with FIGS. 7A-7B. The DL association set of the FDD SCell may also be a superset of a TDD DL association set of the DL-reference UL/DL configuration of the primary cell, as described below in connection with FIGS. 8A-8B. Furthermore, the DL association set of the FDD SCell may be optimized to more evenly distribute subframes in the DL association set, as described below in connection with FIG. 9.

In another case, the PUCCH is transmitted on a configured PUCCH reporting cell. In this case, PUCCH reporting on a SCell may be configured. A FDD cell or a TDD cell may be configured as the PUCCH reporting cell. In a small cell scenario, a UE 102 may receive a stronger DL signal from a macro cell eNB 160, but the uplink to the small cell may be much better than the link to macro cell eNB 160. The macro cell eNB 160 may configure the small cell as the uplink PUCCH reporting cell. For example, if the PCell is a FDD cell and a small cell is a TDD cell, but the uplink to the small cell is much better than the uplink to the PCell, the TDD SCell may be configured to carry PUCCH for PDSCH HARQ-ACK reporting. The PUCCH reporting cell may also be referred to as a reference cell or reporting cell.

If a FDD cell is configured as the PUCCH reporting cell, all cells (including FDD and TDD primary and secondary cells) may follow the FDD timing of the PUCCH reporting cell. In this scenario (where a FDD cell is the PUCCH reporting cell) a TDD cell may be viewed as a half-duplex FDD cell (e.g., with a fixed 4 ms delay). The PDSCH transmission in subframe n−4 may be acknowledged in subframe n. The PDSCH HARQ-ACK information of all cells may be aggregated and reported on the PUCCH of the PUCCH reporting cell or a PUSCH with the lowest Cell_ID. Therefore, if the serving cell is a FDD cell and the serving cell is a PUCCH reporting cell or if the serving cell is a secondary cell and a PUCCH reporting cell is a FDD cell, the UE 102 may determine 204 a PDSCH HARQ-ACK transmission timing for the serving cell upon detection of a PDSCH transmission in an earlier subframe (e.g., n−4) intended for the UE 102. The PDSCH HARQ-ACK information may be sent in a later subframe (e.g., n).

In another scenario, a TDD cell may be configured as the PUCCH reporting cell. In this scenario, the PDSCH HARQ-ACK information of all serving cells may be aggregated and reported on the PUCCH of the PUCCH reporting cell or a PUSCH with the lowest Cell_ID. The DL association set and PDSCH HARQ-ACK transmission timing of an aggregated cell may follow a DL-reference UL/DL configuration of the cell.

In one implementation, the DL-reference UL/DL configuration of the TDD PUCCH reporting cell is the PUCCH reporting cell UL/DL configuration. The DL-reference UL/DL configuration may be used to determine the DL association set of the PUCCH reporting cell. The UE 102 may determine 204 the PDSCH HARQ-ACK transmission timing of the PUCCH reporting cell based on the DL association set of the PUCCH reporting cell.

In another implementation, the DL-reference UL/DL configuration of a TDD cell other than the PUCCH reporting cell (e.g., a TDD PCell or SCell) may be determined by the combination of the PUCCH reporting cell UL/DL configuration and the TDD cell UL/DL configuration following Table (4) as describe below in connection with FIG. 5. For example, the TDD PUCCH reporting cell UL/DL configuration corresponds to the PCell UL/DL configuration of Table (4) and the TDD cell UL/DL configuration corresponds to the SCell UL/DL configuration or Table (4). The DL-reference UL/DL configuration of the TDD cell may be used for the DL association set of the TDD cell.

The UE 102 may determine 204 the PDSCH HARQ-ACK transmission timing for the TDD cell based on the DL association set of the TDD cell. Therefore, when the PUCCH reporting cell is a TDD cell, the serving cell is a TDD cell and the serving cell is a secondary cell, the DL association set for the serving cell is determined based on a DL-reference UL/DL configuration of the serving cell. The DL-reference UL/DL configuration of the serving cell is determined based on a TDD UL/DL configuration of the PUCCH reporting cell and a TDD UL/DL configuration of the serving cell.

In yet another configuration, the DL association set of a FDD SCell is determined based on a DL-reference UL/DL configuration of the PUCCH reporting cell. The DL association set for the FDD SCell may be obtained by a table for a FDD cell DL association set using the DL-reference UL/DL configuration of the PUCCH reporting cell as an input of the table, as described below in connection with FIGS. 7A-7B. The DL association set may also be a superset of a TDD DL association set of the DL-reference UL/DL configuration of the PUCCH reporting cell, as described below in connection with FIGS. 8A-8B. Furthermore, the DL association set may be optimized to more evenly distribute subframes in the DL association set, as described below in connection with FIG. 9.

It should be noted that in all cases, if a TDD cell is configured with dynamic UL/DL reconfiguration with traffic adaptation (e.g., the TDD cell is an eIMTA cell), then the DL-reference UL/DL configuration used in CA may be based on the DL-reference UL/DL configuration of the eIMTA cell. Therefore, in one case, if an eIMTA TDD cell is configured as the PCell, a DL-reference UL/DL configuration of the eIMTA cell may be used to determine 204 the PDSCH HARQ-ACK transmission timing for each serving cell for FDD and TDD carrier aggregation. In another case, if an eIMTA TDD cell is configured as the PUCCH reporting cell, a DL-reference UL/DL configuration of the eIMTA cell may be used to determine 204 the PDSCH HARQ-ACK transmission timing for each serving cell for FDD and TDD carrier aggregation.

The UE 102 may send 206 PDSCH HARQ-ACK information based on the PDSCH HARQ-ACK transmission timing. For example, the UE 102 may send 206 PDSCH HARQ-ACK information in a transmission uplink subframe corresponding to a DL association set of the serving cell. The UE 102 may send 206 the PDSCH HARQ-ACK information on a PUCCH or a PUSCH.

In the case where PUCCH is transmitted only on a primary cell, the UE 102 may send 206 PDSCH HARQ-ACK information on the PUCCH of the primary cell or the PUSCH with the lowest Cell_ID. In one implementation, the UE 102 may aggregate and send 206 the PDSCH HARQ-ACK of all cells on the PUCCH of the PCell or a PUSCH with the lowest Cell_ID.

In the case where PUCCH is transmitted on a configured PUCCH reporting cell, the UE 102 may send 206 PDSCH HARQ-ACK information on the PUCCH of the PUCCH reporting cell or the PUSCH with the lowest Cell_ID. In one implementation, the UE 102 may aggregate and send 206 the PDSCH HARQ-ACK of all cells on the PUCCH of the PUCCH reporting cell or a PUSCH with the lowest Cell_ID.

Figure 3:
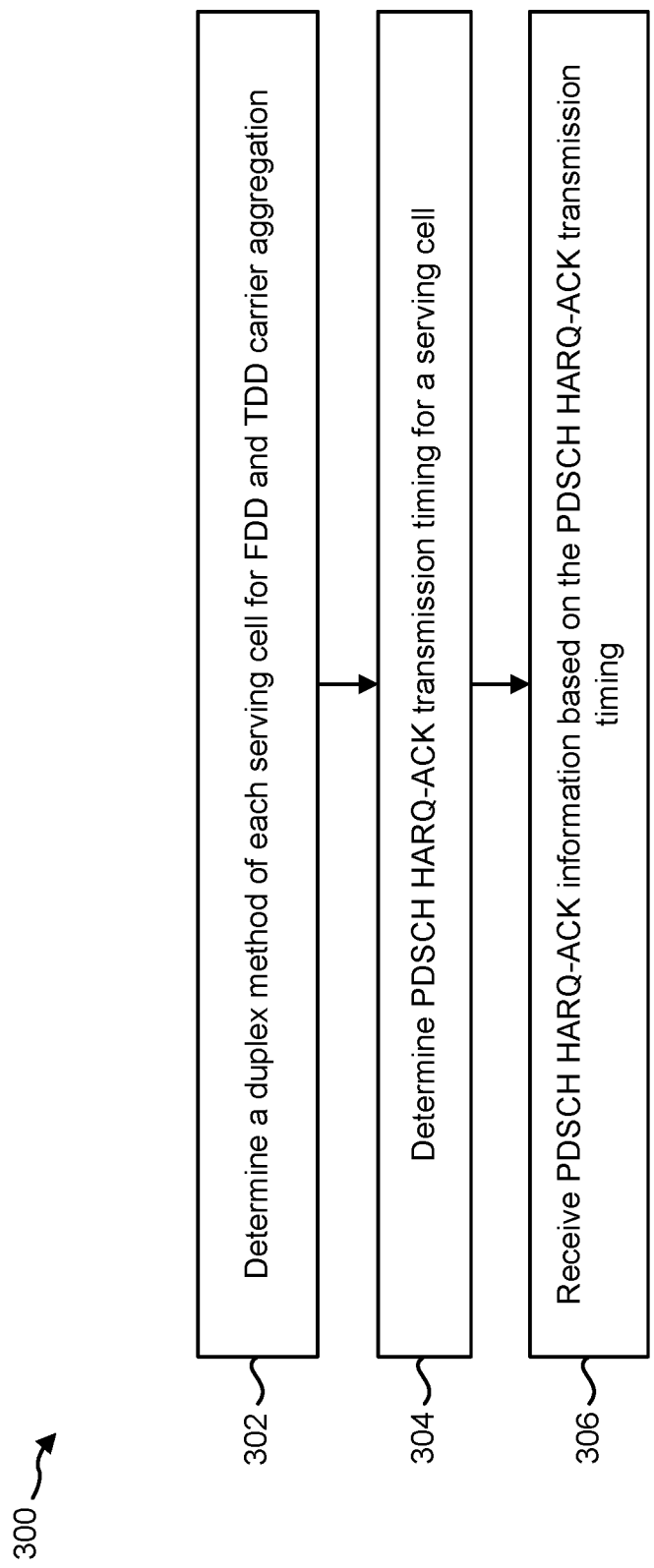
FIG. 3 is a flow diagram illustrating one implementation of a method for performing carrier aggregation by an eNB.

FIG. 3 is a flow diagram illustrating one implementation of a method 300 for performing carrier aggregation by an eNB 160. The eNB 160 may be located in a wireless communication network in which carrier aggregation may be performed with one or more FDD cells and one or more TDD cells. In one implementation, the wireless communication network may be an LTE network.

The eNB 160 may communicate with a UE 102 over a serving cell using either FDD or TDD duplexing. The eNB 160 may determine 302 the duplex method of each of the configured serving cells used in FDD and TDD carrier aggregation for the UE 102. In other words, the eNB 160 may determine 302 whether a serving cell is a FDD cell or a TDD cell. It should be noted that in one implementation of carrier aggregation, all configured cells for the UE 102 may be controlled and scheduled by the same eNB 160. In another implementation of carrier aggregation although a cell may be a remote radio head (RRH) that is physically separated from the eNB 160, but still under the same eNB 160 scheduler). A set of serving cells may be different for each UE 102. Therefore, an eNB 160 may determine or identify whether each serving cell of each UE 102 is a FDD cell or a TDD cell. In one implementation, the duplex method of each cell may be assumed to be determined and fixed in a deployment phase.

The eNB 160 may determine 304 PDSCH HARQ-ACK transmission timing for a serving cell. In one case, the PUCCH is transmitted only on a primary cell (PCell). In this case, the PCell may be either an FDD cell or a TDD cell. In one scenario, a FDD cell is the PCell. In this scenario, all cells (including FDD and TDD secondary cells (SCells)) may follow the FDD timing of the PCell. The PDSCH transmission in subframe n−4 may be acknowledged in subframe n. The PDSCH HARQ-ACK information of all cells may be aggregated and reported on the PUCCH of the PCell or a PUSCH with the lowest Cell_ID.

In another scenario, a TDD cell is the PCell. In this scenario, the PDSCH HARQ-ACK information of all serving cells may be aggregated and reported on the PUCCH of the PCell or a PUSCH with the lowest Cell_ID. The DL association set and PDSCH HARQ-ACK transmission timing of an aggregated cell may follow a DL-reference UL/DL configuration of the cell. In one implementation, the DL-reference UL/DL configuration of the TDD PCell is the PCell UL/DL configuration. The DL-reference UL/DL configuration may be used for the DL association set of the TDD PCell. The eNB 160 may determine 304 the PDSCH HARQ-ACK transmission timing of the TDD PCell based on the DL association set.

In another implementation, the DL-reference UL/DL configuration of a TDD SCell may be determined by the combination of the PCell UL/DL configuration and the SCell UL/DL configuration following Table (4) as describe below in connection with FIG. 5. The DL-reference UL/DL configuration of the TDD SCell may be used for the DL association set of the TDD SCell. The eNB 160 may determine 304 the PDSCH HARQ-ACK transmission timing of the TDD SCell based on the DL association set.

In yet another implementation, the DL association set of a FDD SCell is determined based on a DL-reference UL/DL configuration of the primary cell. The DL association set for the FDD SCell may be obtained by a table for a FDD cell DL association set using the DL-reference UL/DL configuration of the primary cell as an input of the table, as described below in connection with FIGS. 7A-7B. The DL association set of the FDD SCell may be a superset of a TDD DL association set of the DL-reference UL/DL configuration of the primary cell, as described below in connection with FIGS. 8A-8B. Furthermore, the DL association set may be optimized to more evenly distribute subframes in the DL association set, as described below in connection with FIG. 9.

In another case, the PUCCH is transmitted on a configured PUCCH reporting cell. In this case, PUCCH reporting on a SCell may be configured. A FDD cell or a TDD cell may be configured as the PUCCH reporting cell.

In one scenario, a FDD cell may be configured as the PUCCH reporting cell. In this scenario, all cells (including FDD and TDD primary and secondary cells) may follow the FDD timing of the PUCCH reporting cell. The PDSCH transmission in subframe n−4 may be acknowledged in subframe n.

In another scenario, a TDD cell may be configured as the PUCCH reporting cell. In this scenario, the PDSCH HARQ-ACK information of all serving cells may be aggregated and reported on the PUCCH of the PUCCH reporting cell or a PUSCH with the lowest Cell_ID.

In one implementation, the DL-reference UL/DL configuration of the TDD PUCCH reporting cell is the PUCCH reporting cell UL/DL configuration. The DL-reference UL/DL configuration of the PUCCH reporting cell may be used for the DL association set of the PUCCH reporting cell. The eNB 160 may determine 304 the PDSCH HARQ-ACK transmission timing of the PUCCH reporting cell based on the DL association set.

In another implementation, the DL-reference UL/DL configuration of a TDD cell other than the PUCCH reporting cell (e.g., a TDD primary or secondary cell) may be determined by the combination of the PUCCH reporting cell UL/DL configuration and the TDD cell UL/DL configuration following Table (4) as describe below in connection with FIG. 5. For example, the TDD PUCCH reporting cell UL/DL configuration corresponds to the PCell UL/DL configuration of Table (4) and the TDD cell UL/DL configuration corresponds to the SCell UL/DL configuration of Table (4). The eNB 160 may determine 304 the PDSCH HARQ-ACK transmission timing for the TDD SCell based on the DL association set of the TDD SCell.

In yet another implementation, the DL association set of a FDD SCell may be determined based on a DL-reference UL/DL configuration of the PUCCH reporting cell. The DL association set for the FDD SCell may be obtained from a table for a FDD cell DL association set using the DL-reference UL/DL configuration of the PUCCH reporting cell as an input of the table, as described below in connection with FIGS. 7A-7B. The FDD DL association set may be a superset of a TDD DL association set of the DL-reference UL/DL configuration of the PUCCH reporting cell, as described below in connection with FIGS. 8A-8B. Furthermore, the FDD DL association set may be optimized to more evenly distribute subframes in the DL association set, as described below in connection with FIG. 9.

It should be noted that in all cases, if a TDD cell is configured with dynamic UL/DL reconfiguration with traffic adaptation (e.g., the TDD cell is an eIMTA cell), then the DL-reference UL/DL configuration used in CA may be based on the DL-reference UL/DL configuration of the eIMTA cell. Therefore, in one case, if an eIMTA TDD cell is configured as PCell, a DL-reference UL/DL configuration of the eIMTA cell may be used to determine 204 the PDSCH HARQ-ACK transmission timing for each serving cell for FDD and TDD carrier aggregation. In another case, if an eIMTA TDD cell is configured as the PUCCH reporting cell, a DL-reference UL/DL configuration of the eIMTA cell may be used to determine 304 the PDSCH HARQ-ACK transmission timing for each serving cell for FDD and TDD carrier aggregation.

The eNB 160 may receive 306 PDSCH HARQ-ACK information based on the PDSCH HARQ-ACK transmission timing. For example, the eNB 160 may receive 306 PDSCH HARQ-ACK information in a transmission uplink subframe corresponding to a DL association set of the serving cell. The eNB 160 may receive 306 the PDSCH HARQ-ACK information on a PUCCH or a PUSCH.

In the case where PUCCH is transmitted only on a primary cell, the eNB 160 may receive 306 PDSCH HARQ-ACK information on the PUCCH of the primary cell or the PUSCH with the lowest Cell_ID. In one implementation, the eNB 160 may receive 306 the aggregated PDSCH HARQ-ACK information of each serving cell on the PUCCH of the PCell or a PUSCH with the lowest Cell_ID.

In the case where PUCCH is transmitted on a configured PUCCH reporting cell, the eNB 160 may receive 306 PDSCH HARQ-ACK information on the PUCCH of the PUCCH reporting cell or the PUSCH with the lowest Cell_ID. In one implementation, the eNB 160 may receive 306 the aggregated PDSCH HARQ-ACK information of each serving cell on the PUCCH of the PUCCH reporting cell or a PUSCH with the lowest Cell_ID.

Figure 4:
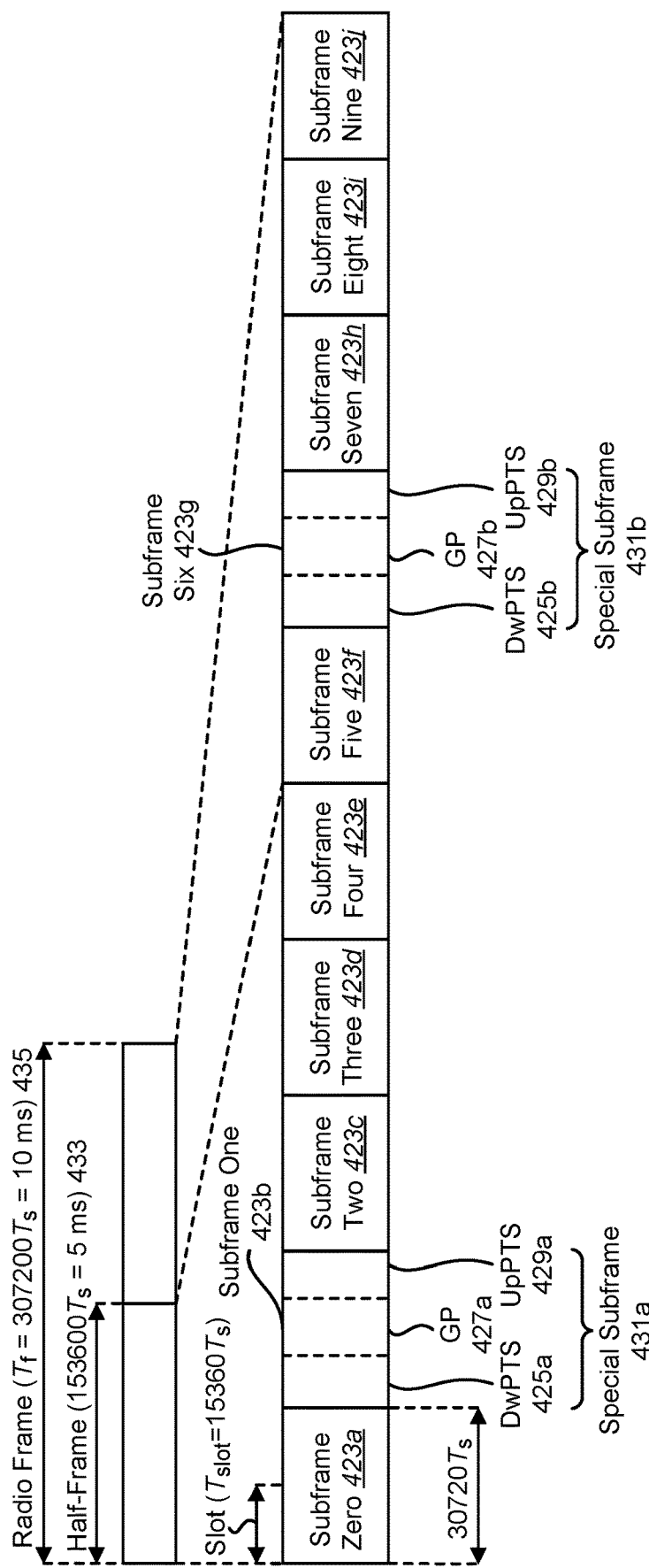
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure illustrates a TDD structure. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)}$$

seconds. The radio frame 435 may include two half-frames 433, each having a length of $153600 \cdot T_s = 5$ ms. Each half-frame 433 may include five subframes 423a-e, 423f-j each having a length of $30720 \cdot T_s = 1$ ms.

TDD UL/DL configurations 0-6 are given below in Table (1) (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table (1) below. In Table (1), "D" denotes a downlink subframe, "S" denotes a special subframe and "U" denotes a UL subframe.

TABLE (1)

| TDD UL/DL Configuration Number | Downlink-to-Uplink Switch-Point Periodicity | Subframe Number |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_s = 1$ ms. In Table (2), "cyclic prefix" is abbreviated as "CP" and "configuration" is abbreviated as "Config" for convenience.

TABLE (2)

| Special Subframe Config | Normal CP in downlink | | | Extended CP in downlink | | |
|---|---|---|---|---|---|---|
|   |   | UpPTS | | | UpPTS | |
|   | DwPTS | Normal CP in uplink | Extended CP in uplink | DwPTS | Normal CP in uplink | Extended CP in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (2) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot.

UL/DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 433 includes a standard special subframe 431a-b. In the case of 10 ms downlink-to-uplink switch-point periodicity, a special subframe 431 may exist in the first half-frame 433 only.

Subframe zero (e.g., 0) 423a and subframe five (e.g., 5) 423f and DwPTS 425a-b may be reserved for downlink transmission. The UpPTS 429a-b and the subframe(s) immediately following the special subframe(s) 431a-b (e.g., subframe two 423c and subframe seven 423h) may be reserved for uplink transmission. It should be noted that, in some implementations, special subframes 431 may be considered DL subframes in order to determine a set of DL subframe associations that indicate UCI transmission uplink subframes of a UCI transmission cell.

Figure 5:
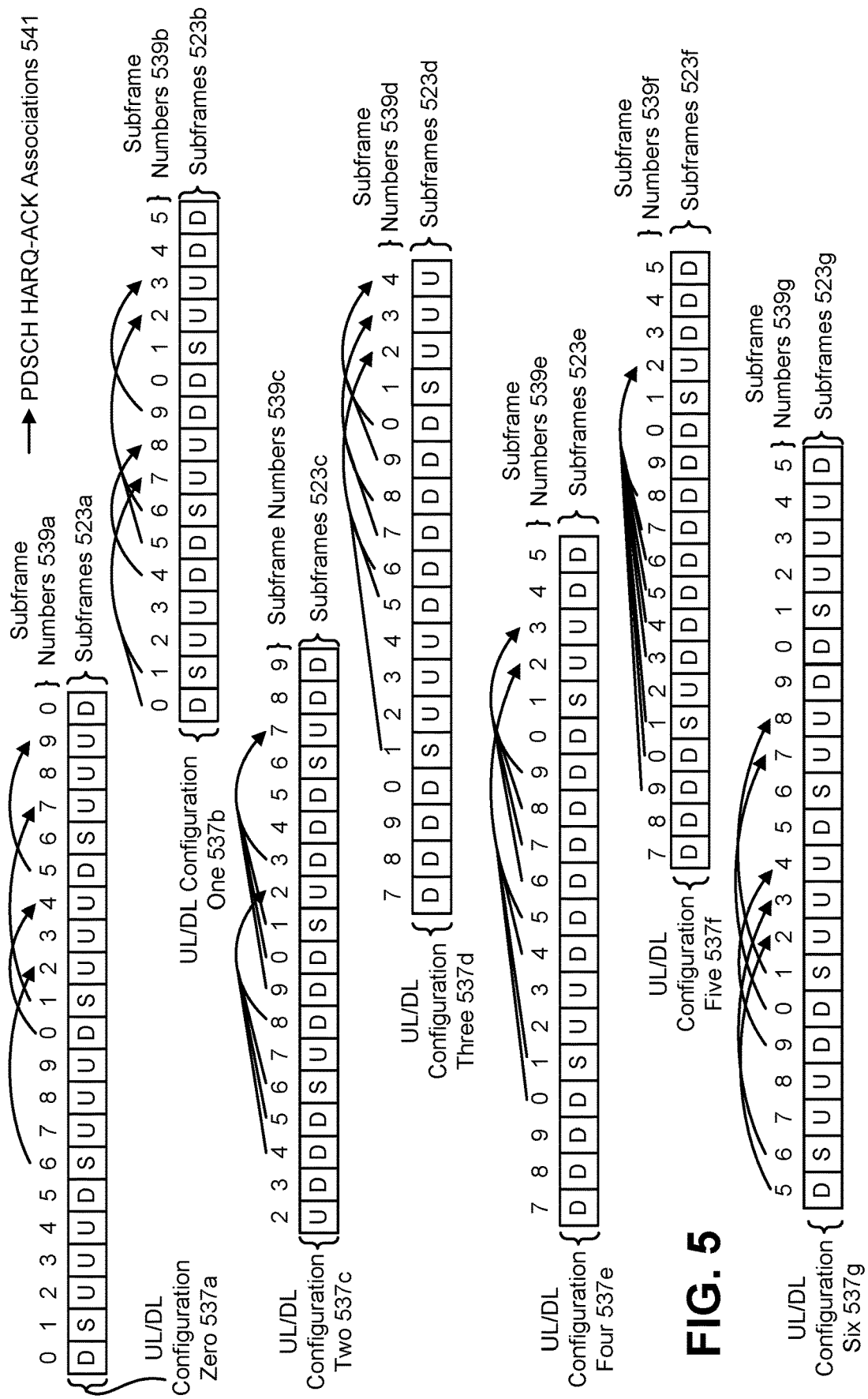
FIG. 5 is a diagram illustrating some Time-Division Duplexing (TDD) uplink-downlink (UL/DL) configurations in accordance with the systems and methods described herein.

FIG. 5 is a diagram illustrating some TDD UL/DL configurations 537a-g in accordance with the systems and methods described herein. There are seven different TDD UL/DL configurations, all with different association timings. In particular, FIG. 5 illustrates UL/DL configuration zero 537a (e.g., "UL/DL configuration 0") with subframes 523a and subframe numbers 539a, UL/DL configuration one 537b (e.g., "UL/DL configuration 1") with subframes 523b and subframe numbers 539b, UL/DL configuration two 537c (e.g., "UL/DL configuration 2") with subframes 523c and subframe numbers 539c and UL/DL configuration three 537d (e.g., "UL/DL configuration 3") with subframes 523d and subframe numbers 539d. FIG. 5 also illustrates UL/DL configuration four 537e (e.g., "UL/DL configuration 4") with subframes 523e and subframe numbers 539e, UL/DL configuration five 537f (e.g., "UL/DL configuration 5") with subframes 523f and subframe numbers 539f and UL/DL configuration six 537g (e.g., "UL/DL configuration 6") with subframes 523g and subframe numbers 539g.

FIG. 5 further illustrates PDSCH HARQ-ACK associations 541 (e.g., PDSCH HARQ-ACK feedback on PUCCH or PUSCH associations). The PDSCH HARQ-ACK associations 541 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods disclosed herein may be applied to one or more of the UL/DL configurations 537a-g illustrated in FIG. 5. For example, one or more PDSCH HARQ-ACK associations 541 corresponding to one of the UL/DL configurations 537a-g illustrated in FIG. 5 may be applied to communications between a UE 102 and eNB 160. For example, a UL/DL configuration 537 may be determined (e.g., assigned to, applied to) a PCell. In this case, PDSCH HARQ-ACK associations 541 may specify PDSCH HARQ-ACK timing (e.g., a HARQ-ACK reporting subframe) for HARQ-ACK feedback transmissions corresponding to the PCell. For SCell HARQ-ACK feedback transmissions, the PDSCH HARQ-ACK associations 541 corresponding to a DL-reference UL/DL configuration in accordance with the feedback parameters may be utilized.

A PDSCH HARQ-ACK association 541 may specify a particular (PDSCH HARQ-ACK) timing for receiving HARQ-ACK information corresponding to a PDSCH. A PDSCH HARQ-ACK association 541 may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

The downlink association set and PDSCH HARQ-ACK transmission timing for all TDD UL/DL configurations are illustrated in FIG. 5. Table (3) (from Table 10.1.3.1-1 of 3GPP TS 36.213) provides TDD DL association sets. In particular, Table (3) provides DL association set index K:$\{k_0, k_1, \ldots k_{M-1}\}$ for TDD.

reporting may only be carried on the PCell. For PUSCH reporting, the PDSCH HARQ-ACK information may be reported on the PUSCH of a cell with the lowest Cell_ID.

According to a known solution (e.g., Release-11), a UE 102 may be configured with more than one TDD serving cell. If at least two serving cells have different TDD UL/DL configurations and if a serving cell is a primary cell, then the primary cell UL/DL configuration is the DL-reference UL/DL configuration for the serving cell.

According to the known solution, at least two serving cells may have different TDD UL/DL configurations and a serving cell may be a secondary cell. If the pair formed by primary cell UL/DL configuration, serving cell UL/DL configuration belongs to Set 1 in Table (4) (from Table 10.2-1 of 3GPP TS 36.213), then the DL-reference UL/DL configuration for the serving cell is defined in the corresponding Set in Table (4). If the UE 102 is not configured to monitor a physical downlink control channel (PDCCH) or enhanced physical downlink control channel (EPDCCH) in another serving cell for scheduling the serving cell, and if the pair formed by primary cell UL/DL configuration, serving cell UL/DL configuration belongs to Set 2 or Set 3 in Table (4), then the DL-reference UL/DL configuration for the serving cell is defined in the corresponding Set in Table (4). If the UE 102 is configured to monitor PDCCH/EPDCCH in another serving cell for scheduling the serving cell, and if the pair formed by primary cell UL/DL configuration, serving cell UL/DL configuration belongs to Set 4 or Set 5 in Table (4), then the DL-reference UL/DL configuration for the serving cell is defined in the corresponding Set in Table (4).

TABLE (3)

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

With inter-band TDD CA with different UL/DL configurations, the association timing of one TDD SCell may follow the timing of a DL-reference UL/DL configuration. The DL-reference UL/DL configuration may be the same as or different from the TDD UL/DL configuration of the given SCell.

The PDSCH scheduling may be performed by corresponding PDCCH formats. For Release-11 and beyond UE, the enhanced PDCCH (ePDCCH) may also be used to schedule PDSCH. The PDSCH HARQ-ACK information of CA cells may be reported on a PUCCH or a PUSCH of one serving cell only. In one implementation, the PUCCH

TABLE (4)

| Set # | (Primary cell UL/DL configuration, Secondary cell UL/DL configuration) | DL-reference UL/DL configuration |
|---|---|---|
| Set 1 | (0, 0) | 0 |
| | (1, 0), (1, 1), (1, 6) | 1 |
| | (2, 0), (2, 2), (2, 1), (2, 6) | 2 |

TABLE (4)-continued

| Set # | (Primary cell UL/DL configuration, Secondary cell UL/DL configuration) | DL-reference UL/DL configuration |
|---|---|---|
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |
| Set 2 | (0, 1), (6, 1) | 1 |
| | (0, 2), (1, 2), (6, 2) | 2 |
| | (0, 3), (6, 3) | 3 |

TABLE (4)-continued

| Set # | (Primary cell UL/DL configuration, Secondary cell UL/DL configuration) | DL-reference UL/DL configuration |
|---|---|---|
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |
| Set 4 | (0, 1), (0, 2), (0, 3), (0, 4), (0, 5), (0, 6) | 0 |
| | (1, 2), (1, 4), (1, 5) | 1 |
| | (2, 5) | 2 |
| | (3, 4), (3, 5) | 3 |
| | (4, 5) | 4 |
| | (6, 1), (6, 2), (6, 3), (6, 4), (6, 5) | 6 |
| Set 5 | (1, 3) | 1 |
| | (2, 3), (2, 4) | 2 |
| | (3, 1), (3, 2) | 3 |
| | (4, 2) | 4 |

According to the known solution, if a UE 102 is configured with more than one serving cell and if at least two serving cells have different UL/DL configurations and if the DL-reference UL/DL configuration for at least one serving cell is TDD UL/DL Configuration 5, then the UE 102 may not be expected to be configured with more than two serving cells. If a UE 102 is configured with one serving cell, or the UE 102 is configured with more than one serving cell and the UL/DL configurations of all serving cells is the same, then the UE 102 may, upon detection of a PDSCH transmission within subframe(s) n−k, where k∈K and K is defined in Table (3) intended for the UE 102 and for which a HARQ-ACK response may be provided, transmit the PDSCH HARQ-ACK response in a UL subframe n.

Furthermore, according to the known solution, if a UE 102 is configured with more than one serving cell and if at least two serving cells have different UL/DL configurations, then the UE 102 may, upon detection of a PDSCH transmission within subframe(s) n-k for serving cell c, where k∈$K_C$ intended for the UE 102 and for which a HARQ-ACK response shall be provided, transmit the PDSCH HARQ-ACK response in UL subframe n. The set $K_C$ may contain values of k∈K such that subframe n-k corresponds to a DL subframe or a special subframe for serving cell c. K defined in Table (3) (where "UL/DL configuration" in Table (3) refers to the "DL-reference UL/DL configuration") may be associated with subframe n.

In one implementation, HARQ-ACK repetition may be enabled. Upon detection of a PDSCH transmission within subframe(s) n−k, where k∈K and K is defined in Table (3) intended for the UE 102 and for which a HARQ-ACK response may be provided, and if the UE 102 is not repeating the transmission of any HARQ-ACK in subframe n corresponding to a PDSCH transmission in a DL subframe earlier than subframe n-k, then the UE 102 may transmit only the HARQ-ACK response (corresponding to the detected PDSCH transmission in subframe n-k) on a PUCCH in the UL subframe n and the next $N_{ANRep}-1$ UL subframes denoted as $n_1, n_{N_{ANRep}-1}$. The UE 102 may not transmit any other signal in UL subframe n, $n_1, \ldots n_{N_{ANRep}-1}$. Furthermore, the UE 102 may not transmit any HARQ-ACK response repetitions corresponding to any detected PDSCH transmission in subframes $n_i-k$, where k∈$K_i$, $K_i$ is the set defined in Table (3) corresponding to UL subframe $n_i$, and 1≤i≤ $N_{ANRep}-1$.

For TDD HARQ-ACK bundling, if the UE 102 detects that at least one downlink assignment has been missed, the UE 102 may not transmit HARQ-ACK information on PUCCH if HARQ-ACK is the only uplink control information (UCI) present in a given subframe. The uplink timing for the ACK corresponding to a detected PDCCH/EPDCCH indicating downlink semi-persistent scheduling (SPS) release may be the same as the uplink timing for the HARQ-ACK corresponding to a detected PDSCH.

Figure 6:
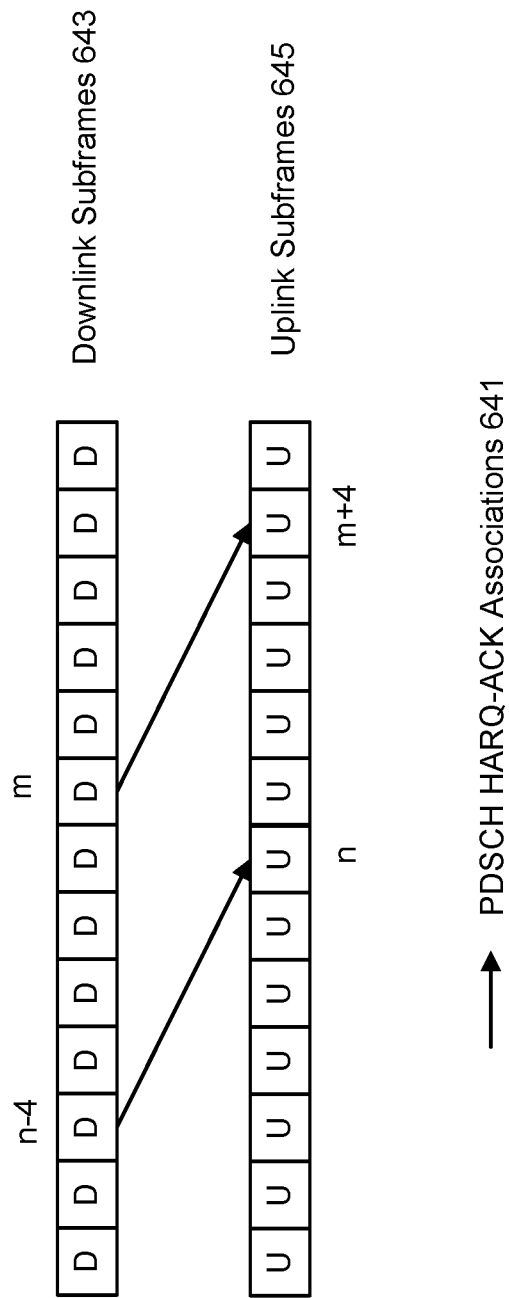
FIG. 6 illustrates the association timings of a Frequency Division Duplexing (FDD) cell.

FIG. 6 illustrates the association timings of a FDD cell. The FDD cell may include paired downlink subframes 643 and uplink subframes 645. The PDSCH HARQ-ACK associations 641 for an FDD cell are illustrated. The PDSCH HARQ-ACK associations 641 may indicate HARQ-ACK reporting subframes corresponding to subframes for PDSCH transmissions (e.g., subframes in which PDSCH transmissions may be sent and/or received). In some implementations, the PDSCH HARQ-ACK reporting may occur on a PUCCH or a PUSCH.

A fixed 4 ms interval may be applied to the PDSCH HARQ-ACK associations 641. In one implementation, each of the downlink subframes 643 and uplink subframes 645 may be 1 ms. Therefore, the PDSCH HARQ-ACK transmission in subframe m+4 may be associated with a PDSCH transmission in subframe m. Similarly, a PDSCH transmission in subframe n−4 may be associated with the PDSCH HARQ-ACK transmission in subframe n.

According to a known solution (e.g., Release-11), for FDD, the UE 102 may, upon detection of a PDSCH transmission in subframe n−4 intended for the UE 102 and for which an HARQ-ACK may be provided, transmit the HARQ-ACK response in subframe n. If HARQ-ACK repetition is enabled, upon detection of a PDSCH transmission in subframe n−4 intended for the UE 102 and for which a HARQ-ACK response may be provided, and if the UE 102 is not repeating the transmission of any HARQ-ACK in subframe n corresponding to a PDSCH transmission in subframes $n-N_{ANRep}-3, \ldots, n-5$, the UE 102 may transmit only the HARQ-ACK response (corresponding to the detected PDSCH transmission in subframe n−4) on PUCCH in subframes $n, n+1, \ldots, n+N_{ANRep}-1$. The UE 102 may not transmit any other signal in subframes $n, n+1, \ldots, n+N_{ANRep}-1$. Furthermore, the UE 102 may not transmit any HARQ-ACK response repetitions corresponding to any detected PDSCH transmission in subframes $n-3, \ldots, n+N_{ANRep}-5$.

Figure 7A:
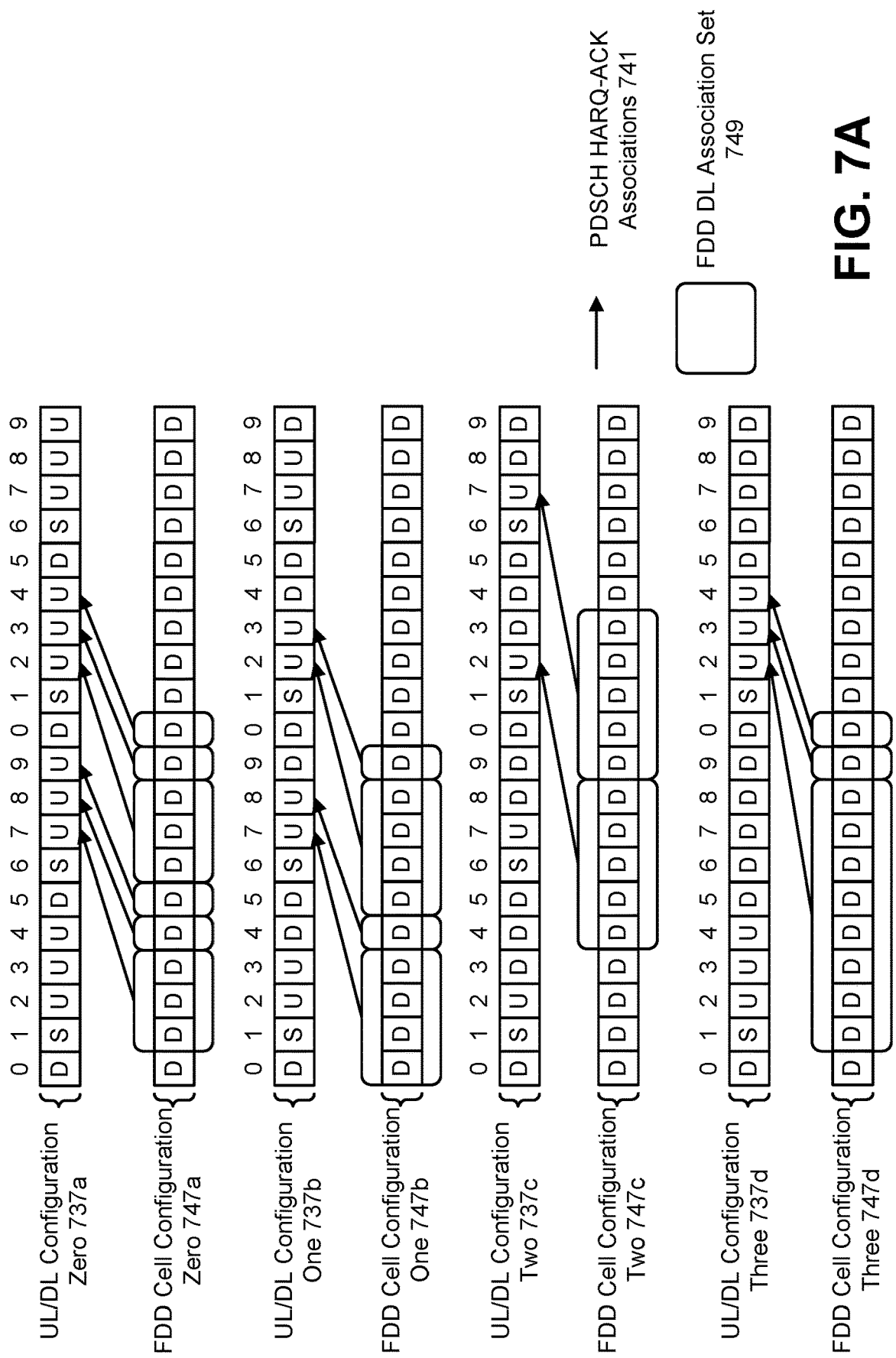
FIGS. 7A-7B illustrate a first implementation of downlink association sets for a FDD cell.
Figure 7B:
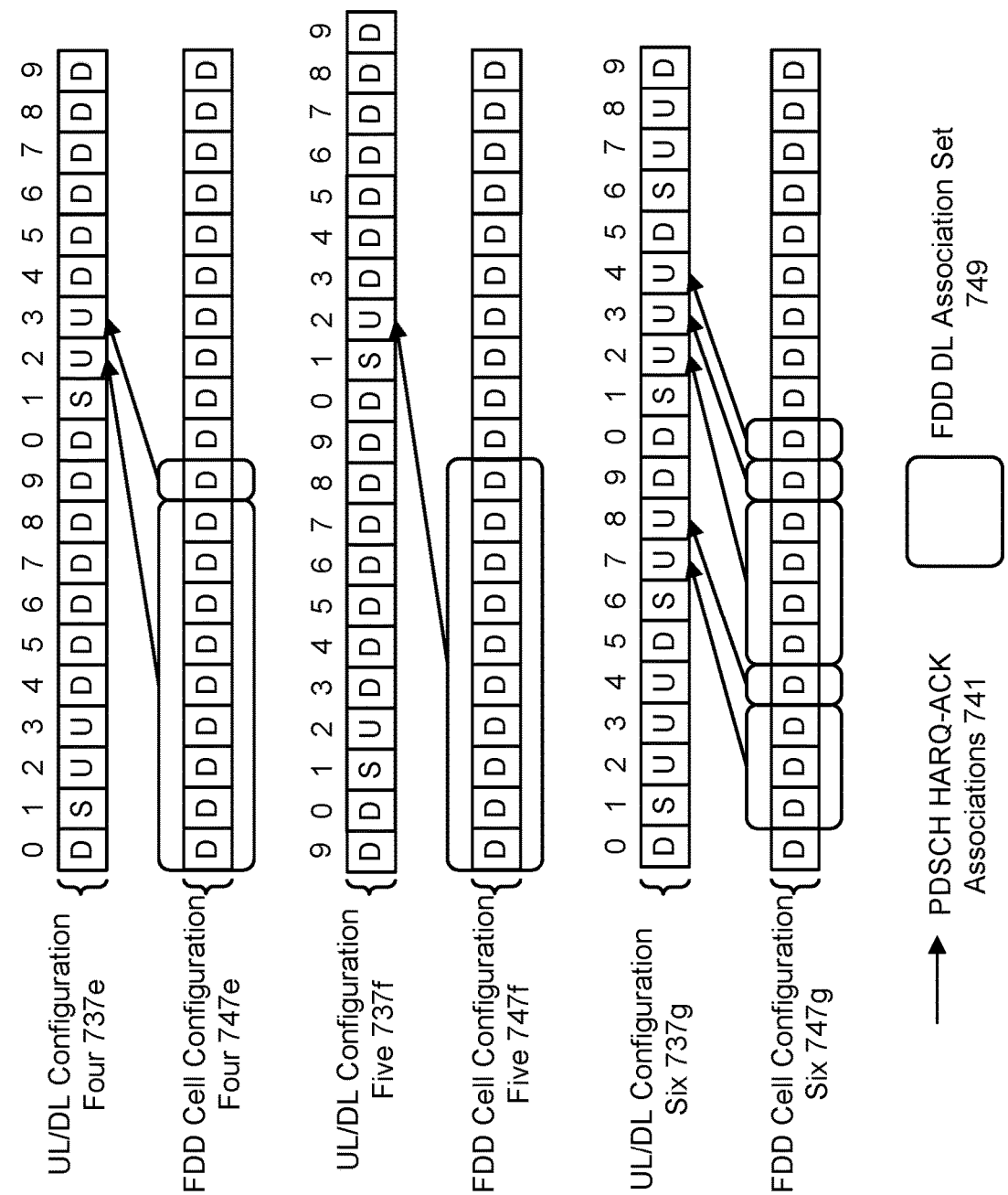

FIGS. 7A-7B illustrate a first implementation of downlink association sets 749 for a FDD cell. As one base assumption, the distance between a UL subframe and an associated DL subframe may be greater than or equal to 4 ms. The DL association set 749 of a FDD cell may consist of a set of continuous subframes. There should be no overlapping and crossing between FDD DL association sets 749 of each UL subframe. Each FDD DL association set 749 may include a PDSCH HARQ-ACK association 741 for providing feedback for a downlink transmission in FDD.

In FIG. 7A, FDD cell configuration zero 747*a* is based on UL/DL configuration zero 737*a*. FDD cell configuration one 747*b* is based on UL/DL configuration one 737*b*. FDD cell configuration two 747*c* is based on UL/DL configuration two 737*c*. FDD cell configuration three 747*d* is based on UL/DL configuration three 737*d*.

In FIG. 7B, FDD cell configuration four 747*e* is based on UL/DL configuration four 737*e*. FDD cell configuration five 747*f* is based on UL/DL configuration five 737*f*. FDD cell configuration six 747*g* is based on UL/DL configuration six 737*g*.

The FDD DL association sets 749 may be determined mathematically for a given TDD UL/DL configuration 737. A target for the mathematical determination is to map all 10

FDD DL subframes into all FDD DL association sets 749 for the UL subframes in a balanced manner while minimizing delay. Equations (1) and (2) may be used to map a DL subframe of a FDD cell to a UL subframe in a TDD PCell or a TDD PUCCH reporting cell.

$$\sum_{i=0}^{k-1} m_i = 10 \quad (1)$$

$$d_{ij} \geq 4 \quad (2)$$

In equation (1), k is the UL subframes for a given UL/DL configuration, thus k is also the number of DL association sets 749 for a given FDD cell configuration 747*a-g*. Furthermore, in equation (1), $m_i$ is the number of DL subframes in the ith FDD DL association set 749, where i=0, 1, . . . k−1. In equation (2), $d_{ij}$ is the distance between the jth DL subframe in the ith FDD DL association set 749 to the ith UL subframe, i=0, 1, . . . k−1, j=0, 1, . . . $m_i$−1, and $d_{ij}$ is greater than or equal to 4 (e.g., $d_{ij} \geq 4$).

In the implementation illustrated in FIGS. 7A-7B, a DL subframe of a FDD cell is always mapped to the closest UL subframe in the TDD PCell or TDD PUCCH reporting cell that is at least 4 ms apart. Thus, only equation (1) and (2) above may be applied (without additional optimization). The benefit of this implementation is simplicity and a minimum distance between the DL transmission and the UL HARQ-ACK feedback. However, this implementation may have very unbalanced DL association set size, which may cause HARQ-ACK performance degradation for the uplink subframes carrying large HARQ-ACK payloads. Furthermore, the FDD DL association set 749 may be very different from the corresponding TDD downlink association set (based on one of the UL/DL configurations 737*a-g*).

The FDD DL association sets 749 according to the first implementation are summarized in Table (5), and illustrated in FIGS. 7A-7B. In particular, Table (5) provides a FDD DL association set index K:{$k_0$, $k_1$, . . . $k_{M-1}$} for a TDD UL/DL configuration. In one case, the TDD UL/DL configuration refers to the DL-reference UL/DL configuration of a TDD PCell. In another case, the TDD UL/DL configuration refers to the DL-reference UL/DL configuration of a configured TDD Cell for PUCCH reporting.

to the given TDD UL/DL configuration. Conversely, the TDD DL association set may be a subset of the FDD DL association set 849 of the given TDD UL/DL configuration. Therefore, the same timing may be maintained for the FDD subframes with DL allocation in TDD, and extra FDD DL subframes may be added to the TDD downlink association set to form the FDD DL association set 849. For a TDD UL/DL configuration 837, the DL subframes are evenly distributed to the UL subframes of the TDD cell. With extra DL subframes added to the TDD downlink association set, the FDD DL association set 849 is more balanced than in the first implementation described above in connection with FIGS. 7A-7B.

Figure 8A:
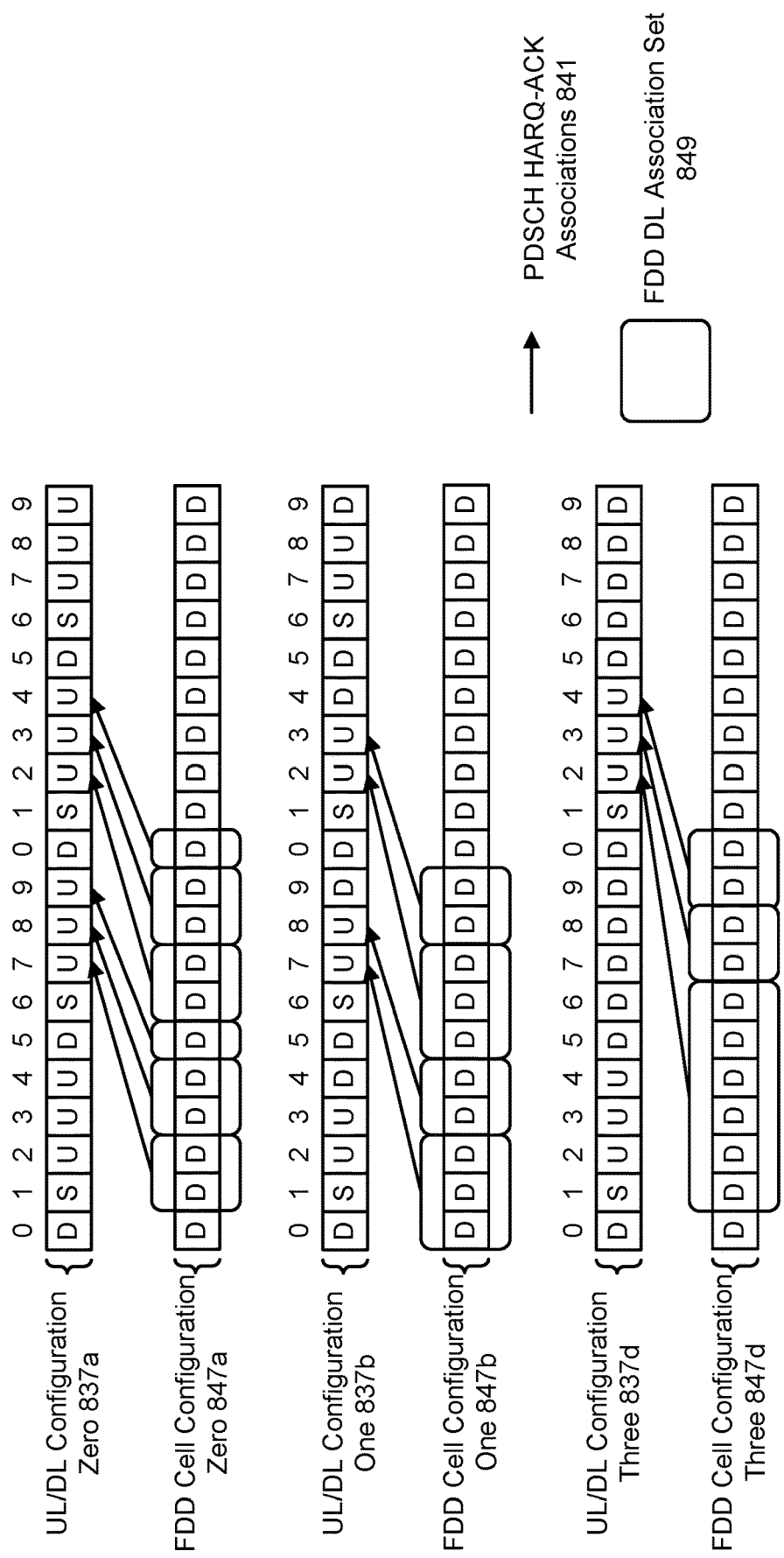
FIGS. 8A-8B illustrate a second implementation of downlink association sets for a FDD cell.
Figure 8B:
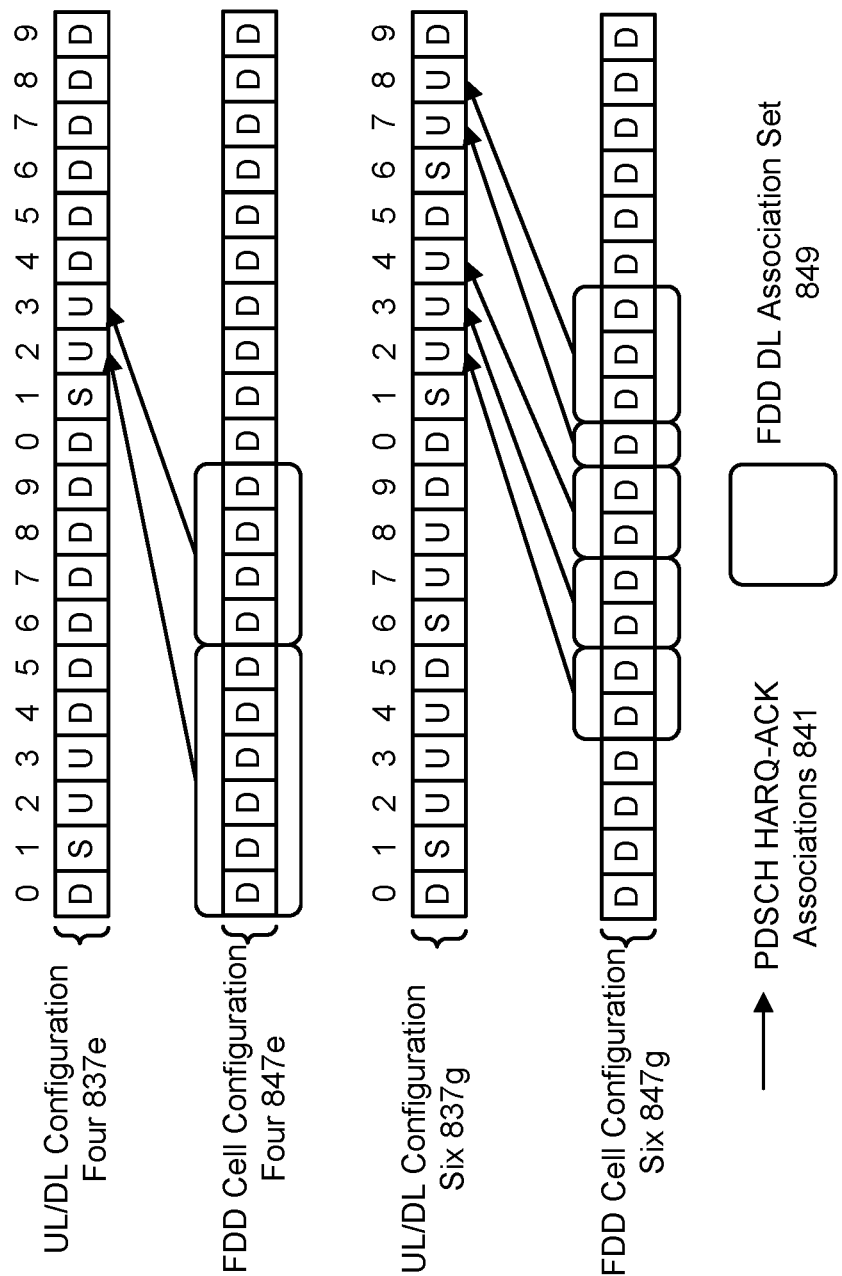

In the second implementation illustrated in FIGS. 8A-8B, equations (1) and (2) are applied. However, a constraint that the TDD downlink association set is a subset of the FDD downlink association set may be applied to equations (1) and (2). Equation (2) provides a minimum distance of 4 ms between DL transmission and UL feedback, which is satisfied in all existing TDD DL-association sets. The constraint of a TDD superset is provided in equations (3) and (4).

$$\min(m_{max} - m_{min}) \quad (3)$$

$$\min\left(\sum_{i=0}^{k-1} \sum_{j=0}^{m_i-1} d_{ij}\right) \quad (4)$$

In equation (3), $m_{max}$ is the maximum number of DL subframes in all k FDD DL association sets 849, where $m_{max}$=max($m_i$). Furthermore, in equation (3), $m_{min}$ is the minimum number of DL subframes in all k FDD DL association sets 849, where $m_{min}$=min($m_i$). In equation (4), $d_{ij}$ is the distance between the jth DL subframe in the ith FDD DL association set 849 to the ith UL subframe, i=0, 1, . . . k−1, j=0, 1, . . . $m_i$−1, and $d_{ij}$ is greater than or equal to 4. k is the UL subframes for a given UL/DL configuration and $m_i$ is the number of DL subframes in the ith FDD DL association set, i=0, 1, . . . k−1.

The FDD DL association sets 849 according to the second implementation are summarized in Table (6). The underlined indexes are those included from the TDD association set (as summarized in Table (3)), while the remaining indexes are

TABLE (5)

| TDD UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | 4 | 4 | — | — | 6, 5, 4 | 4 | 4 |
| 1 | — | — | 7, 6, 5, 4 | 4 | — | — | — | 7, 6, 5, 4 | 4 | — |
| 2 | — | — | 8, 7, 6, 5, 4 | — | — | — | — | 8, 7, 6, 5, 4 | — | — |
| 3 | — | — | 11, 10, 9, 8, 7, 6, 5, 4 | 4 | 4 | — | — | — | — | — |
| 4 | — | — | 12, 11, 10, 9, 8, 7, 6, 5, 4 | 4 | — | — | — | — | — | — |
| 5 | — | — | 13, 12, 11, 10, 9, 8, 7, 6, 5, 4 | — | — | — | — | — | — | — |
| 6 | — | — | 7, 6, 5, 4 | 4 | 4 | — | — | 6, 5, 4 | 4 | — |

FIGS. 8A-8B illustrate a second implementation of downlink association sets 849 for a FDD cell. In this implementation, FDD downlink association set 849 is a superset of the downlink association set of a given TDD UL/DL configuration 837. As used herein, when a FDD DL association set 849 is a superset of the DL association set of a corresponding TDD DL association set, this means that all subframes in the DL association set of a TDD UL/DL configuration are included in the FDD DL association set 849 corresponding added for the FDD DL association set 849. It should be noted that for TDD UL/DL configurations 2 and 5, the FDD DL association set 849 is the same as in the first implementation (as described above in connection with FIGS. 7A-7B). The FDD DL association sets 849 for other TDD UL/DL configurations that are different from the first implementation are illustrated in FIGS. 8A-8B. Table (6) provides a FDD DL association set index K:{$k_0$, $k_1$, . . . $k_{M-1}$} for a TDD UL/DL configuration.

TABLE (6)

| TDD UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | <u>6</u>, 5 | 5, 4 | <u>4</u> | — | — | <u>6</u>, 5 | 5, 4 | <u>4</u> |
| 1 | — | — | <u>7, 6</u>, 5 | 5, <u>4</u> | — | — | — | <u>7, 6</u>, 5 | 5, <u>4</u> | — |
| 2 | — | — | <u>8, 7, 6</u>, 5, <u>4</u> | — | — | — | — | <u>8, 7,</u> <u>6</u>, 5, <u>4</u> | — | — |
| 3 | — | — | <u>11</u>, 10, 9, 8, <u>7, 6</u> | <u>6</u>, 5 | <u>5</u>, 4 | — | — | — | — | — |
| 4 | — | — | <u>12, 11</u>, 10, 9, <u>8, 7</u> | <u>7, 6</u>, 5, 4 | — | — | — | — | — | — |
| 5 | — | — | <u>13, 12, 11</u>, 10, <u>9</u>, 8, 7, 6, 5, 4 | — | — | — | — | — | — | — |
| 6 | — | — | 8, <u>7</u> | <u>7</u>, 6 | 6, <u>5</u> | — | — | <u>7</u> | <u>7</u>, 6, 5 | — |

Each FDD DL association set 849 may include a PDSCH HARQ-ACK association 841 for providing feedback for a downlink transmission in FDD. In FIG. 8A, FDD cell configuration zero 847*a* is based on UL/DL configuration zero 837*a*. FDD cell configuration one 847*b* is based on UL/DL configuration one 837*b*. FDD cell configuration three 847*d* is based on UL/DL configuration three 837*d*.

In FIG. 8B, FDD cell configuration four 847*e* is based on UL/DL configuration four 837*e*. FDD cell configuration six 847*g* is based on UL/DL configuration six 837*g*.

An alternative FDD downlink association set (not illustrated in FIGS. 8A-8B) for TDD UL/DL configurations 0, 1 and 6 with a superset of TDD downlink association set is summarized in Table (7). The FDD downlink association sets for TDD UL/DL configuration 0 and TDD UL/DL configuration 1 in Table (7) provide similar subframe distribution as provided in Table (6), but have larger total distance than in Table (6). The alternative FDD downlink association set for TDD UL/DL configuration 6 has worse subframe distribution, but smaller total distance than provided in Table (6). The underlined indexes are those included from the TDD association set (as summarized in Table (3)), the remaining indexes are added for the FDD DL association set.

UL/DL configurations (e.g. TDD UL/DL configurations 3, 4, and 6), the number of subframes in different FDD DL association sets are still not very balanced, and further optimization may be applied.

A target of the optimization equation (3) is to minimize the difference between the maximum number of subframes and the minimum number of subframes in the FDD DL association sets 949 of a given TDD UL/DL configuration 937. Therefore, with k as the number of UL subframes of a given TDD UL/DL configuration 937, the number of FDD DL association sets, the minimum difference between $m_{max}$ and $m_{min}$ is either 0 or 1. According to equation (5), $m_{max}$ may be given by a ceiling(10/k) function and $m_{min}$ may be given by a floor(10/k) function.

$$m_{max} = \left\lceil \frac{10}{k} \right\rceil; m_{min} = \left\lfloor \frac{10}{k} \right\rfloor \quad (5)$$

For FDD DL association set 949 optimization, equation (5) may be equivalent to equation (3). Furthermore, the overall distance between the DL and UL subframes should be minimized with equation (4). Thus, the third implemen-

TABLE (7)

| TDD UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | <u>6</u>, 5 | 5 | 5, <u>4</u> | — | — | <u>6</u>, 5 | 5 | 5, <u>4</u> |
| 0 | — | — | <u>6</u> | 6, 5 | 5, <u>4</u> | — | — | <u>6</u> | 6, 5 | 5, <u>4</u> |
| 1 | — | — | <u>7, 6</u> | 6, 5, <u>4</u> | — | — | — | <u>7, 6,</u> | 6, 5, <u>4</u> | — |
| 6 | — | — | <u>7</u> | <u>7</u>, 6 | 6, <u>5</u> | — | — | <u>7</u> | <u>7</u>, 6, 5, 4 | — |

Figure 9:
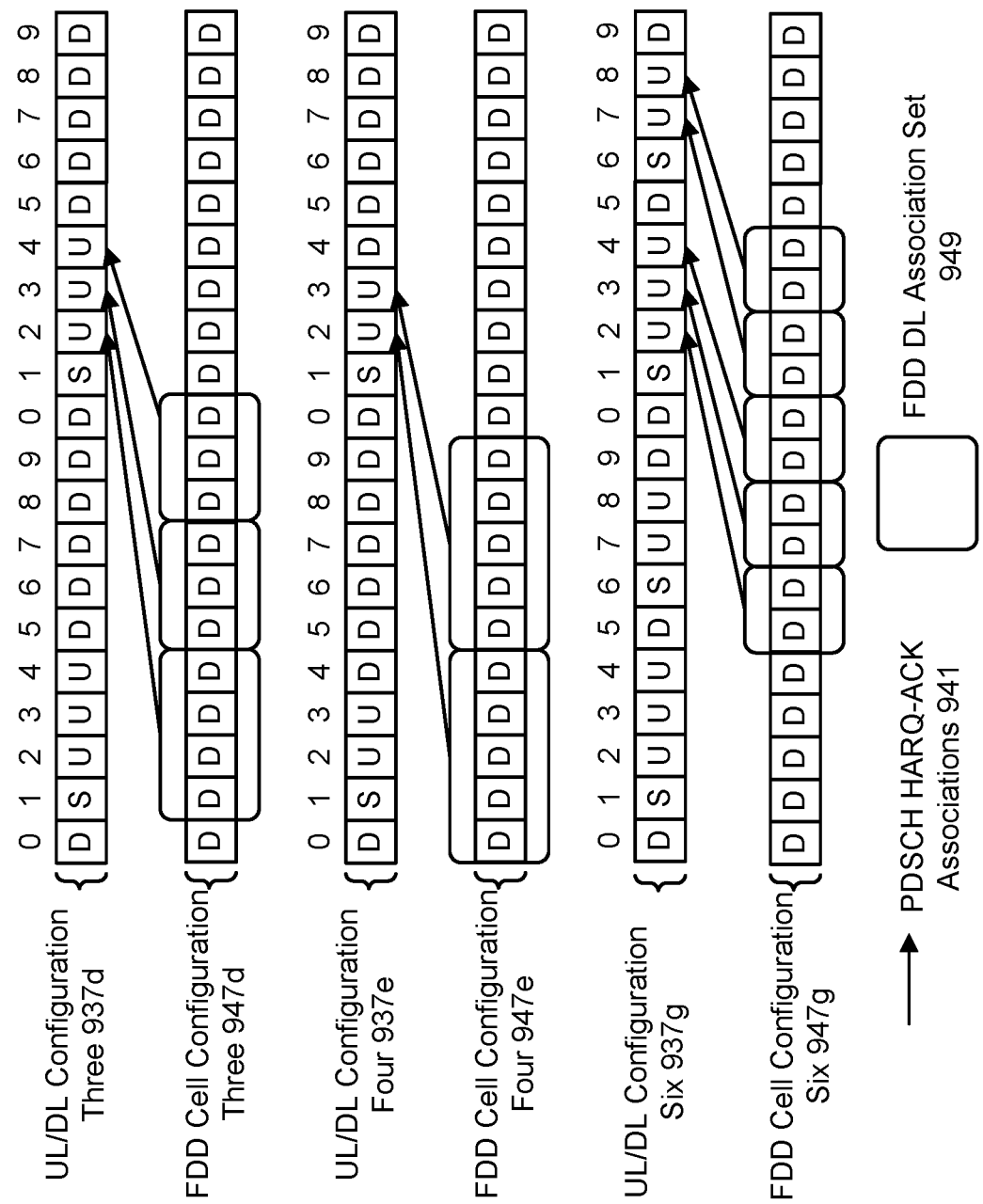
FIG. 9 illustrates a third implementation of downlink association sets for a FDD cell.

FIG. 9 illustrates a third implementation of downlink association sets 949 for a FDD cell. In this implementation, the FDD downlink association sets 949 are balanced in the number of DL subframes included in each FDD downlink association set 949. For a TDD UL/DL configuration 937, the subframes may be evenly distributed to the UL subframes of the reporting TDD cell. The FDD downlink association set 949 in the second implementation (described in connection with FIGS. 8A-8B) provides that the same subframe linkage is maintained for TDD DL subframes, and the FDD downlink association set size is more balanced compared with the first implementation (described in connection with FIGS. 7A-7B). However, for some TDD tation may employ all optimization criteria with equations (1), (2), (3) and (4), and may remove the constraint that a TDD downlink association set is a subset of the FDD downlink association set 949.

Based on the optimization criteria, the FDD DL association set 949 with the third implementation is summarized in Table (8). It should be noted that for TDD UL/DL configurations 0, 1, 2 and 5, the FDD DL association sets 949 are the same as the second implementation (summarized in Table (6)). Only TDD UL/DL configurations 3, 4, 6 are further optimized, as illustrated in FIG. 9. Table (8) provides a FDD DL association set index K:{($k_0$, $k_1$, ... $k_{M-1}$} for a TDD UL/DL configuration.

TABLE (8)

| TDD UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6, 5 | 5, 4 | — | — | — | 7, 6, 5 | 5, 4 | — |
| 2 | — | — | 8, 7, 6, 5, 4 | — | — | — | — | 8, 7, 6, 5, 4 | — | — |
| 3 | — | — | 11, 10, 9, 8 | 8, 7, 6 | 6, 5, 4 | — | — | — | — | — |
| 4 | — | — | 12, 11, 10, 9, 8 | 8, 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 7, 6 | 6, 5 | 5, 4 | — | — | 6, 5 | 5, 4 | — |

As illustrated in FIG. 9, each FDD DL association set 949 may include a PDSCH HARQ-ACK association 941 for providing feedback for a downlink transmission in FDD. FDD cell configuration three 947d is based on UL/DL configuration three 937d. FDD cell configuration four 947e is based on UL/DL configuration four 937e. FDD cell configuration six 947g is based on UL/DL configuration six 937g.

Alternative FDD downlink association sets for TDD UL/DL configuration 3 are listed in Table (9). These alternatives provide balanced subframe distribution, but have larger total distances than the one in Table (8), thus not optimal results according to equation (4).

TABLE (9)

| TDD UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 11, 10, 9 | 9, 8, 7 | 7, 6, 5, 4 | — | — | — | — | — |
| 3 | — | — | 11, 10, 9 | 9, 8, 7, 6 | 6, 5, 4 | — | — | — | — | — |

Figure 10:
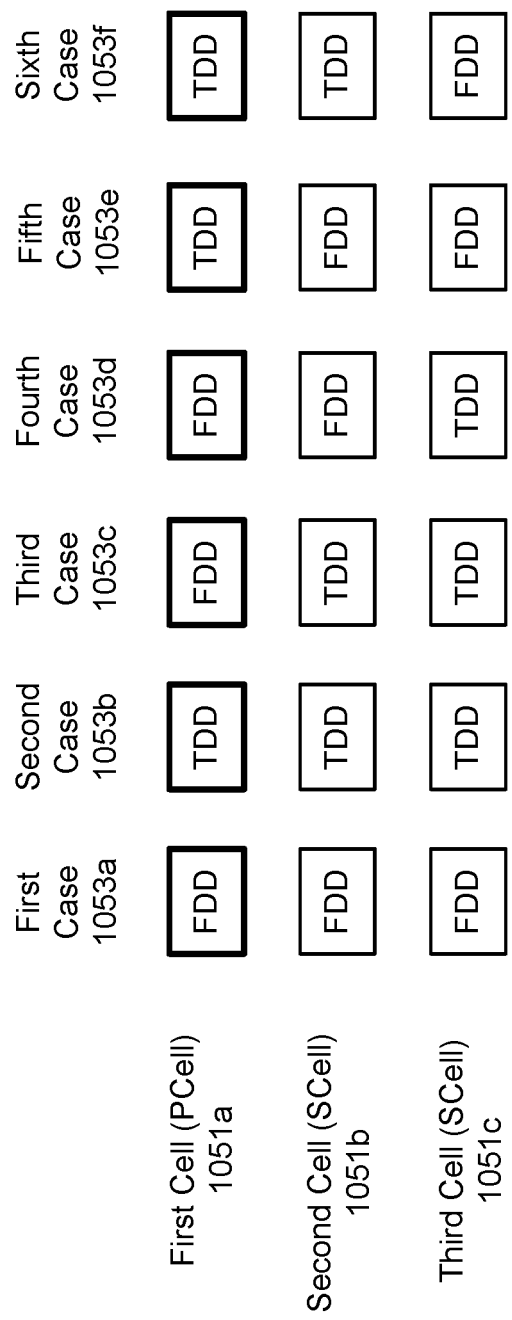
FIG. 10 illustrates various cases of carrier aggregation with physical uplink control channel (PUCCH) reporting only on a primary cell (PCell)

FIG. 10 illustrates various cases 1053a-f of carrier aggregation with PUCCH reporting only on a PCell 1051a. Hybrid carrier aggregation with different duplexing methods of FDD and TDD is not currently supported in Release-11. However, according to the systems and methods described herein, the DL association set and PDSCH HARQ-ACK transmission timing may be defined for both TDD and FDD cells to follow a reference cell configuration during TDD and FDD CA. FIG. 10 shows example cases 1053a-f of carrier aggregation for PUCCH reporting on PCell 1051a only (indicated by a bold border). In FIG. 10, two SCells 1051b,c may also be included in carrier aggregation.

The first case 1053a shows FDD only CA. The second case 1053b shows TDD only CA. The third case 1053c shows that a PCell 1051a is FDD and the SCells 1051b,c are TDD. The fourth case 1053d shows that a PCell 1051a is FDD and one SCell 1051b is FDD and another SCell 1051c is TDD. The fifth case 1053e shows that a PCell 1051a is TDD and the SCells 1051b,c are FDD. The sixth case 1053f shows that a PCell 1051a is TDD and one SCell 1051b is TDD and another SCell 1051c is FDD.

This Figure is applicable to the case described above in connection with FIG. 2 where PUCCH reporting is only on a PCell 1051a. It should be noted that the systems and methods described above are not limited to three serving cells 1051. For example, there may be two serving cells 1051 or more than three serving cells 1051 in accordance with the described systems and methods.

FIG. 11 illustrates various cases 1153a-h of carrier aggregation with PUCCH reporting with a configured PUCCH reporting cell 1151b. The PUCCH reporting cell 1151b may be an SCell 1151c. The PUCCH reporting cell 1151b may be configured by the PCell 1151a with higher layer signaling (e.g., radio resource control (RRC) signaling). In FIG. 11, the PUCCH reporting cell 1151b is indicated by a bold border.

The first case 1153a shows FDD only CA. The second case 1153b shows TDD only CA. The third case 1153c shows that a PUCCH reporting cell 1151b is FDD, a PCell 1151a is TDD and another SCell 1151c is TDD. The fourth case 1153d shows that a PUCCH reporting cell 1151b is FDD, a PCell 1151a is FDD and another SCell 1151c is TDD. The fifth case 1153e shows that a PUCCH reporting cell 1151b is FDD, a PCell 1151a is TDD and another SCell 1151c is FDD. The sixth case 1153f shows that a PUCCH reporting cell 1151b is TDD, a PCell 1151a is FDD and another SCell 1151c is FDD. The seventh case 1153g shows that a PUCCH reporting cell 1151b is TDD, a PCell 1151a is FDD and another SCell 1151c is TDD. The eighth case 1153h shows that a PUCCH reporting cell 1151b is TDD, a PCell 1151a is TDD and another SCell 1151c is FDD.

This Figure is applicable to the case described above in connection with FIG. 2 where PUCCH reporting may be provided by a configured PUCCH reporting cell 1151b. It should be noted that the systems and methods described above are not limited to three serving cells 1151. For example, there may be two serving cells 1151 or more than three serving cells 1151 in accordance with the described systems and methods.

Figure 12:
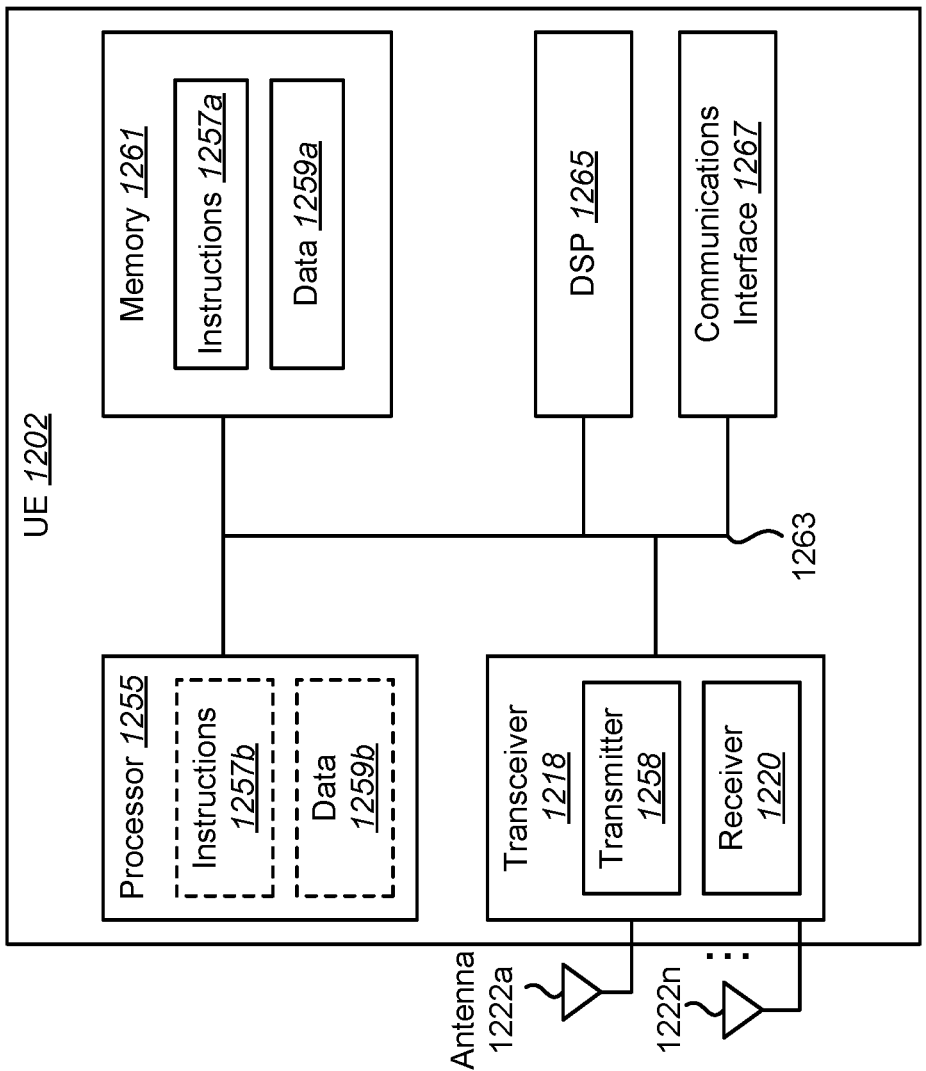
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1255 that controls operation of the UE 1202. The processor 1255 may also be referred to as a central processing unit (CPU). Memory 1261, which may include read-only memory (ROM), random access memory (RAM), a combination of the two or any type of device that may store information, provides instructions 1257a and data 1259a to the processor 1255. A portion of the memory 1261 may also include non-volatile random access memory (NVRAM). Instructions 1257b and data 1259b may also reside in the processor 1255. Instructions 1257b and/or data 1259b loaded into the processor 1255 may also include instructions 1257a and/or data 1259a from memory 1261 that were loaded for execution or processing by the processor 1255. The instructions 1257b may be executed by the processor 1255 to implement one or more of the method 200 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222a-n are attached to the housing and electrically coupled to the transceiver 1218.

The various components of the UE 1202 are coupled together by a bus system 1263, which may include a power bus, a control signal bus and a status signal bus, in addition to a data bus. However, for the sake of clarity, the various buses are illustrated in FIG. 12 as the bus system 1263. The UE 1202 may also include a digital signal processor (DSP) 1265 for use in processing signals. The UE 1202 may also include a communications interface 1267 that provides user access to the functions of the UE 1202. The UE 1202 illustrated in FIG. 12 is a functional block diagram rather than a listing of specific components.

Figure 13:
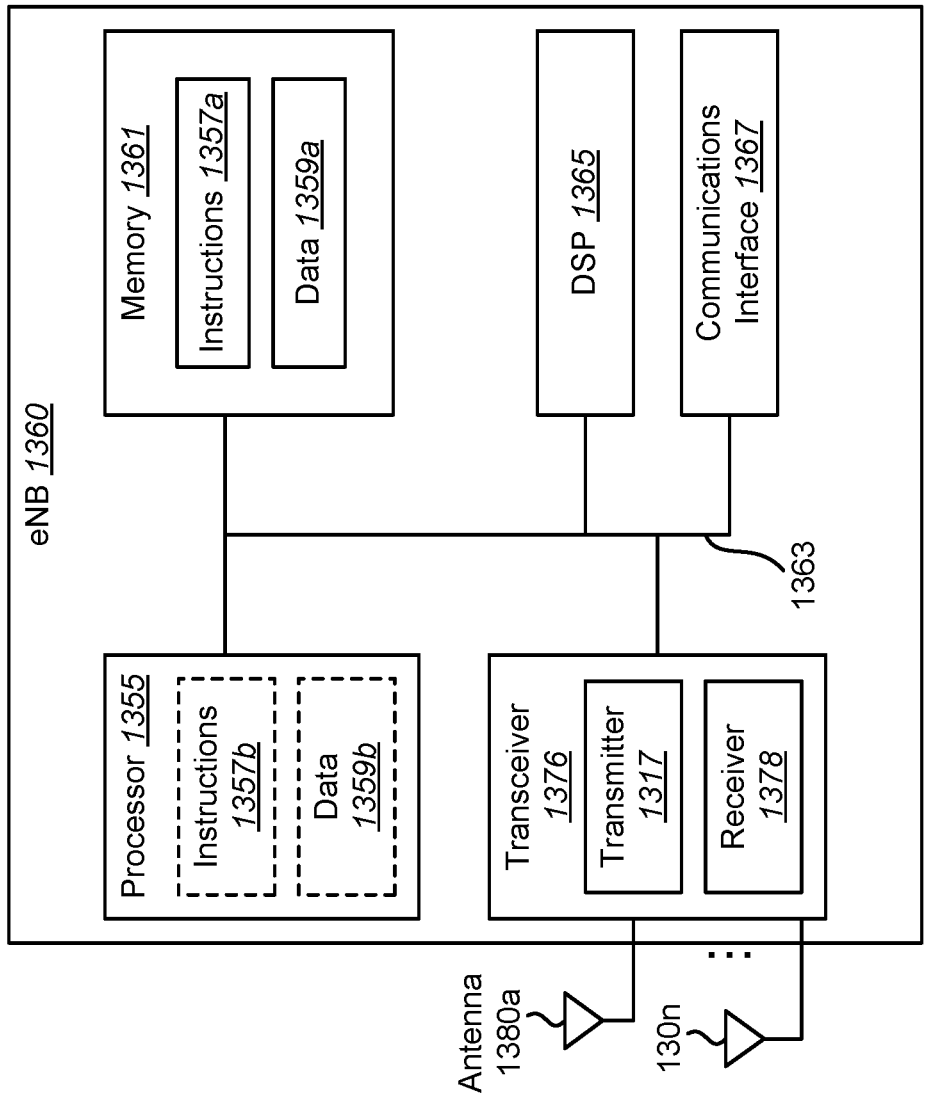
FIG. 13 illustrates various components that may be utilized in an eNB.

FIG. 13 illustrates various components that may be utilized in an eNB 1360. The eNB 1360 described in connection with FIG. 13 may be implemented in accordance with the eNB 160 described in connection with FIG. 1. The eNB 1360 includes a processor 1355 that controls operation of the eNB 1360. The processor 1355 may also be referred to as a central processing unit (CPU). Memory 1361, which may include read-only memory (ROM), random access memory (RAM), a combination of the two or any type of device that may store information, provides instructions 1357a and data 1359a to the processor 1355. A portion of the memory 1361 may also include non-volatile random access memory (NVRAM). Instructions 1357b and data 1359b may also reside in the processor 1355. Instructions 1357b and/or data 1359b loaded into the processor 1355 may also include instructions 1357a and/or data 1359a from memory 1361 that were loaded for execution or processing by the processor 1355. The instructions 1357b may be executed by the processor 1355 to implement one or more of the method 300 described above.

The eNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380a-n are attached to the housing and electrically coupled to the transceiver 1376.

The various components of the eNB 1360 are coupled together by a bus system 1363, which may include a power bus, a control signal bus and a status signal bus, in addition to a data bus. However, for the sake of clarity, the various buses are illustrated in FIG. 13 as the bus system 1363. The eNB 1360 may also include a digital signal processor (DSP) 1365 for use in processing signals. The eNB 1360 may also include a communications interface 1367 that provides user access to the functions of the eNB 1360. The eNB 1360 illustrated in FIG. 13 is a functional block diagram rather than a listing of specific components.

Figure 14:
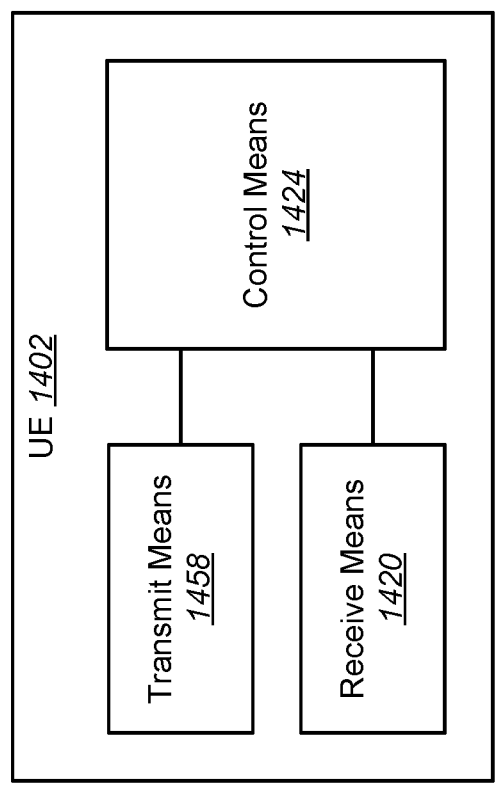
FIG. 14 is a block diagram illustrating one configuration of a UE in which systems and methods for performing carrier aggregation may be implemented.

FIG. 14 is a block diagram illustrating one implementation of a UE 1402 in which systems and methods for performing carrier aggregation may be implemented. The UE 1402 includes transmit means 1458, receive means 1420 and control means 1424. The transmit means 1458, receive means 1420 and control means 1424 may be configured to perform one or more of the functions described in connection with FIG. 2 and FIG. 12 above. FIG. 12 above illustrates one example of a concrete apparatus structure of FIG. 14. Other various structures may be implemented to realize one or more of the functions of FIG. 2 and FIG. 12. For example, a DSP may be realized by software.

Figure 15:
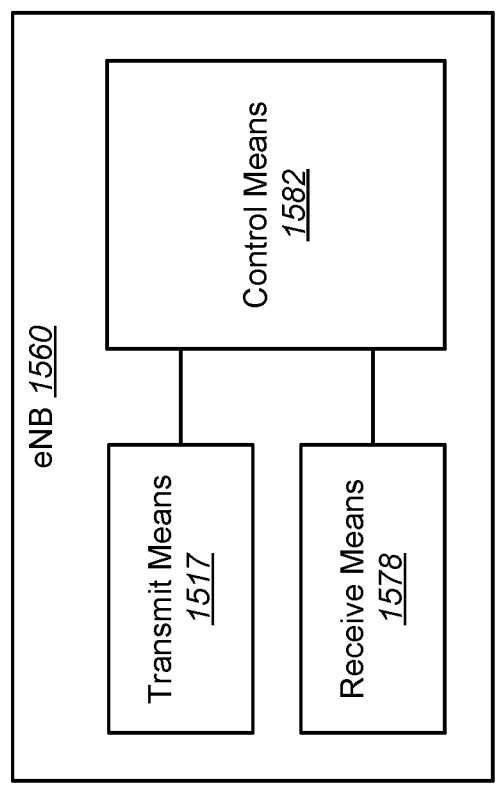
FIG. 15 is a block diagram illustrating one configuration of an eNB in which systems and methods for performing carrier aggregation may be implemented.

FIG. 15 is a block diagram illustrating one implementation of an eNB 1560 in which systems and methods for performing carrier aggregation may be implemented. The eNB 1560 includes transmit means 1517, receive means 1578 and control means 1582. The transmit means 1517, receive means 1578 and control means 1582 may be configured to perform one or more of the functions described in connection with FIG. 3 and FIG. 13 above. FIG. 13 above illustrates one example of a concrete apparatus structure of FIG. 15. Other various structures may be implemented to realize one or more of the functions of FIG. 3 and FIG. 13. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) for performing carrier aggregation, comprising:
   a processor;
   a memory in electronic communication with the processor, wherein instructions stored in the memory are executable to:

determine a duplex method of each of at least two serving cells for carrier aggregation, wherein a primary cell of the at least two serving cells is a time-division duplexing (TDD) cell and a secondary cell of the at least two serving cells is a frequency-division duplexing (FDD) cell;

determine a primary cell uplink/downlink (UL/DL) configuration, wherein the primary cell UL/DL configuration is one of UL/DL configurations 0 through 6;

determine a downlink (DL) association set for the primary cell and a downlink (DL) association set for the secondary cell based on the primary cell UL/DL configuration;

determine physical downlink shared channel (PDSCH) Hybrid Automatic Repeat Request Acknowledgement/Negative Acknowledgement (HARQ-ACK) transmission timing for the primary cell, wherein the PDSCH HARQ-ACK transmission timing for the primary cell is determined based on the DL association set for the primary cell;

determine PDSCH HARQ-ACK transmission timing for the secondary cell, wherein the PDSCH HARQ-ACK transmission timing for the secondary cell is determined based on the DL association set for the secondary cell;

generate PDSCH HARQ-ACK information of the primary cell and the secondary cell based on the DL association set for the primary cell and the DL association set for the secondary cell; and send the PDSCH HARQ-ACK information in a subframe which corresponds to (a) the PDSCH HARQ-ACK transmission timing for the primary cell and (b) the PDSCH HARQ-ACK transmission timing for the secondary cell.

2. The UE of claim 1, wherein the PDSCH HARQ-ACK information is sent on a physical uplink shared channel (PUSCH).

3. An evolved Node B (eNB) for performing carrier aggregation, comprising:
a processor;
a memory in electronic communication with the processor, wherein instructions stored in the memory are executable to:
determine a duplex method of each of at least two serving cells for carrier aggregation, wherein a primary cell of the at least two serving cells is a time-division duplexing (TDD) cell and a secondary cell of the at least two serving cells is a frequency-division duplexing (FDD) cell;

determine a primary cell uplink/downlink (UL/DL) configuration, wherein the primary cell UL/DL configuration is one of UL/DL configurations 0 through 6;

determine a downlink (DL) association set for the primary cell and a downlink (DL) association set for the secondary cell based on the primary cell UL/DL configuration;

determine physical downlink shared channel (PDSCH) Hybrid Automatic Repeat Request Acknowledgement/Negative Acknowledgement (HARQ-ACK) transmission timing for the primary cell, wherein the PDSCH HARQ-ACK transmission timing for the primary cell is determined based on the DL association set for the primary cell;

determine PDSCH HARQ-ACK transmission timing for the secondary cell, wherein the PDSCH HARQ-ACK transmission timing for the secondary cell is determined based on the DL association set for the secondary cell; and receive PDSCH HARQ-ACK information of the primary cell and the secondary cell in a subframe which corresponds to (a) the PDSCH HARQ-ACK transmission timing for the primary cell and (b) the PDSCH HARQ-ACK transmission timing for the secondary cell, wherein the PDSCH HARQ-ACK information of the primary cell and the secondary cell is generated based on the DL association set for the primary cell and the DL association set for the secondary cell.

4. The eNB of claim 3, wherein the PDSCH HARQ-ACK information is received on a physical uplink shared channel (PUSCH).

5. A method of performing carrier aggregation by a user equipment (UE), comprising:
determining a duplex method of each of at least two serving cells for carrier aggregation, wherein a primary cell of the at least two serving cells is a time-division duplexing (TDD) cell and a secondary cell of the at least two serving cells is a frequency-division duplexing (FDD) cell;

determining a primary cell uplink/downlink (UL/DL) configuration, wherein the primary cell UL/DL configuration is one of UL/DL configurations 0 through 6;

determining a downlink (DL) association set for the primary cell and a downlink (DL) association set for the secondary cell based on the primary cell UL/DL configuration;

determining physical downlink shared channel (PDSCH) Hybrid Automatic Repeat Request Acknowledgement/Negative Acknowledgement (HARQ-ACK) transmission timing for the primary cell, wherein the PDSCH HARQ-ACK transmission timing for the primary cell is determined based on the DL association set for the primary cell;

determining PDSCH HARQ-ACK transmission timing for the secondary cell, wherein the PDSCH HARQ-ACK transmission timing for the secondary cell is determined based on the DL association set for the secondary cell;

generating PDSCH HARQ-ACK information of the primary cell and the secondary cell based on the DL association set for the primary cell and the DL association set for the secondary cell; and sending the PDSCH HARQ-ACK information in a subframe which corresponds to (a) the PDSCH HARQ-ACK transmission timing for the primary cell and (b) the PDSCH HARQ-ACK transmission timing for the secondary cell.

6. The method of claim 5, wherein the PDSCH HARQ-ACK information is sent on a physical uplink shared channel (PUSCH).

7. A method of performing carrier aggregation by an evolved Node B (eNB), comprising:
determining a duplex method of each of at least two serving cells for carrier aggregation, wherein a primary cell of the at least two serving cells is a time-division duplexing (TDD) cell and a secondary cell of the at least two serving cells is a frequency-division duplexing (FDD) cell;

determining a primary cell uplink/downlink (UL/DL) configuration, wherein the primary cell UL/DL configuration is one of UL/DL configurations 0 through 6;

determining a downlink (DL) association set for the primary cell and a downlink (DL) association set for the secondary cell based on the primary cell UL/DL configuration;

determining physical downlink shared channel (PDSCH) Hybrid Automatic Repeat Request Acknowledgement/Negative Acknowledgement (HARQ-ACK) transmission timing for the primary cell, wherein the PDSCH HARQ-ACK transmission timing for the primary cell is determined based on the DL association set for the primary cell;

determining PDSCH HARQ-ACK transmission timing for the secondary cell, wherein the PDSCH HARQ-ACK transmission timing for the secondary cell is determined based on the DL association set for the secondary cell; and receiving PDSCH HARQ-ACK information of the primary cell and the secondary cell in a subframe which corresponds to (a) the PDSCH HARQ-ACK transmission timing for the primary cell and (b) the PDSCH HARQ-ACK transmission timing for the secondary cell, wherein the PDSCH HARQ-ACK information of the primary cell and the secondary cell is generated based on the DL association set for the primary cell and the DL association set for the secondary cell.

8. The method of claim 7, wherein the PDSCH HARQ-ACK information is received on a physical uplink shared channel (PUSCH).

\* \* \* \* \*